(12) United States Patent
Masuda et al.

(10) Patent No.: US 7,603,693 B2
(45) Date of Patent: Oct. 13, 2009

(54) CATV UPLINK OPTICAL TRANSMISSION SYSTEM

(75) Inventors: Kouichi Masuda, Hirakata (JP);
Hiroyuki Sasai, Katano (JP); Shinichi Kido, Utsunomiya (JP); Hideyuki Sogabe, Utsunomiya (JP)

(73) Assignee: Panasonic Corporation, Osaka (JP)

( * ) Notice: Subject to any disclaimer, the term of this patent is extended or adjusted under 35 U.S.C. 154(b) by 1014 days.

(21) Appl. No.: 10/437,175

(22) Filed: May 14, 2003

(65) Prior Publication Data

US 2005/0262545 A1    Nov. 24, 2005

(30) Foreign Application Priority Data

May 15, 2002    (JP)    ............................. 2002-139614

(51) Int. Cl.
*H04N 7/173*    (2006.01)
(52) U.S. Cl. .................. 725/120; 725/119; 725/129
(58) Field of Classification Search .................. 725/119, 725/120, 129
See application file for complete search history.

(56) References Cited

U.S. PATENT DOCUMENTS

| 5,646,763 | A | | 7/1997 | Misaizu et al. | |
|---|---|---|---|---|---|
| 5,657,143 | A | | 8/1997 | Hajj et al. | |
| 5,850,400 | A | * | 12/1998 | Eames et al. | 370/443 |
| 5,864,672 | A | | 1/1999 | Bodeep et al. | |
| 5,900,959 | A | | 5/1999 | Noda et al. | |
| 5,963,844 | A | * | 10/1999 | Dail | 725/125 |
| 6,457,178 | B1 | * | 9/2002 | Slim | 725/127 |
| 6,490,727 | B1 | * | 12/2002 | Nazarathy et al. | 725/129 |
| 6,523,177 | B1 | * | 2/2003 | Brown | 725/121 |
| 7,162,732 | B2 | * | 1/2007 | Ovadia | 725/131 |
| 2003/0063352 | A1 | * | 4/2003 | Farhan et al. | 359/180 |
| 2005/0114906 | A1 | * | 5/2005 | Hoarty et al. | 725/135 |

FOREIGN PATENT DOCUMENTS

| EP | 0 506 163 | 9/1992 |
|---|---|---|
| EP | 0 863 626 | 9/1998 |
| EP | 0 926 846 | 6/1999 |
| JP | 6-244799 | 9/1994 |
| JP | 7-202991 | 8/1995 |
| JP | 8-172401 | 7/1996 |
| JP | 9-83451 | 3/1997 |
| JP | 9-312618 | 12/1997 |
| JP | 10-65627 | 3/1998 |
| JP | 10-112689 | 4/1998 |
| JP | 11-284999 | 10/1999 |
| JP | 2000-236296 | 8/2000 |

* cited by examiner

*Primary Examiner*—Christopher Kelley
*Assistant Examiner*—Charles N Hicks
(74) *Attorney, Agent, or Firm*—Wenderoth, Lind & Ponack, L.L.P.

(57) ABSTRACT

A CATV station apparatus subjects received optical signals to processes such as optical-electrical conversion, signal separation, coupling, and demodulation for obtaining an uplink signal. A received photocurrent monitoring section compares a received photocurrent at a optical receiving section with a predetermined reference current. If the received photocurrent is equal to or higher than the reference current, an amplifying section amplifies a signal output from a signal separating section at a predetermined level. If the received photocurrent is lower than the reference current, on the other hand, it is determined that a non-linear phenomenon, such as stimulated Brillouin scattering, has occurred in an optical fiber. The amplifying section then outputs a signal at a level which does not affect, even after being coupled with other signals, communications performed by other optical transmission systems.

22 Claims, 16 Drawing Sheets

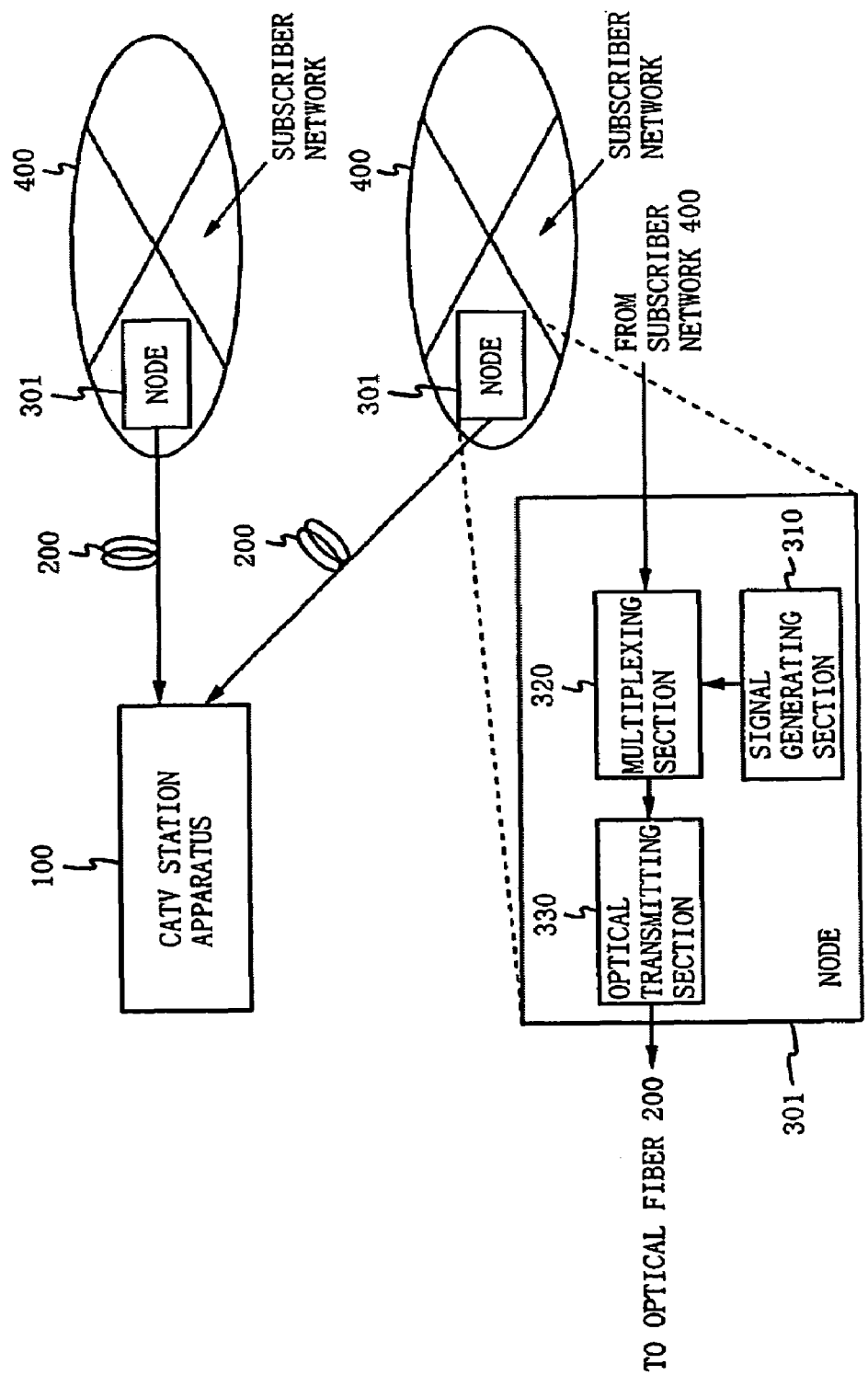

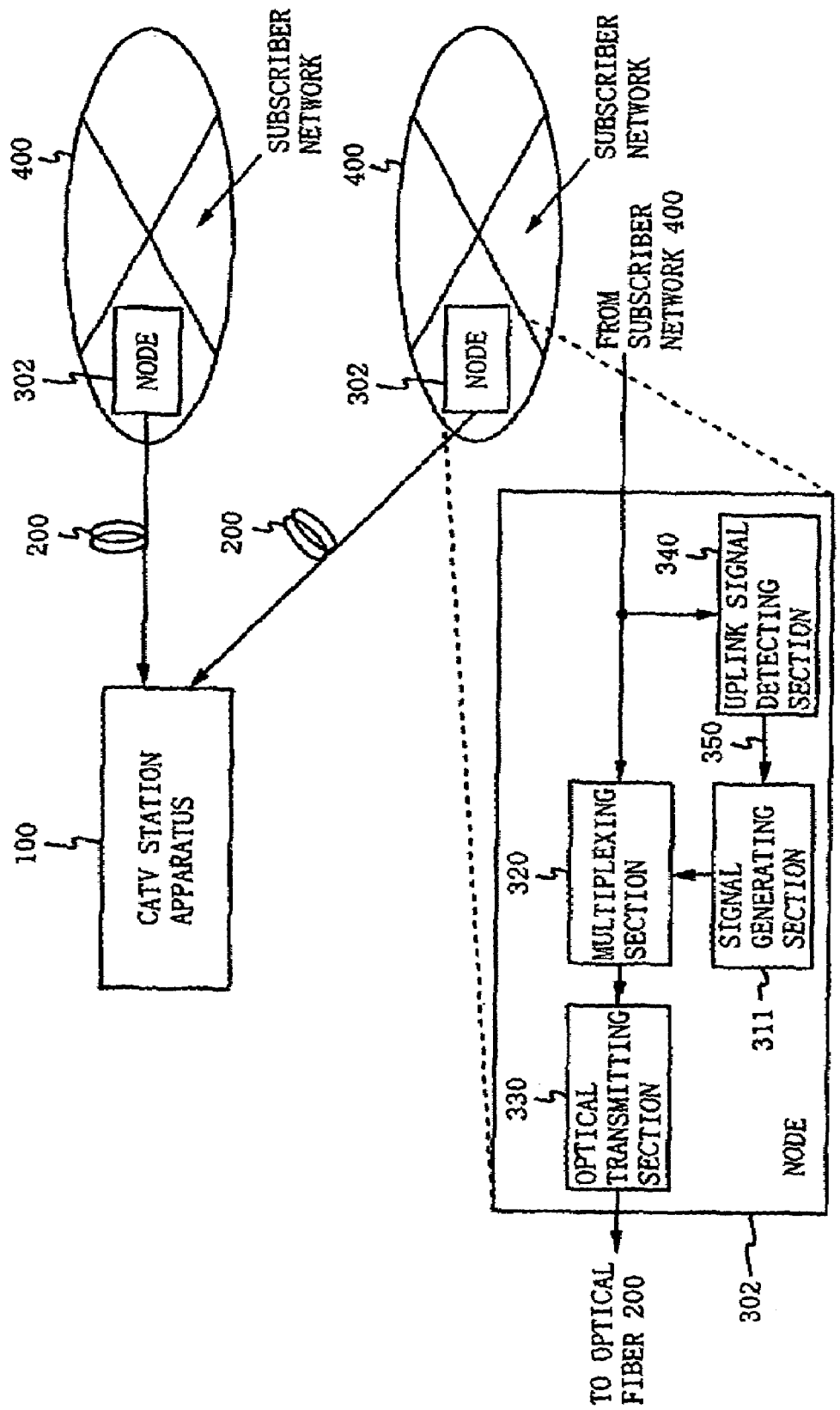

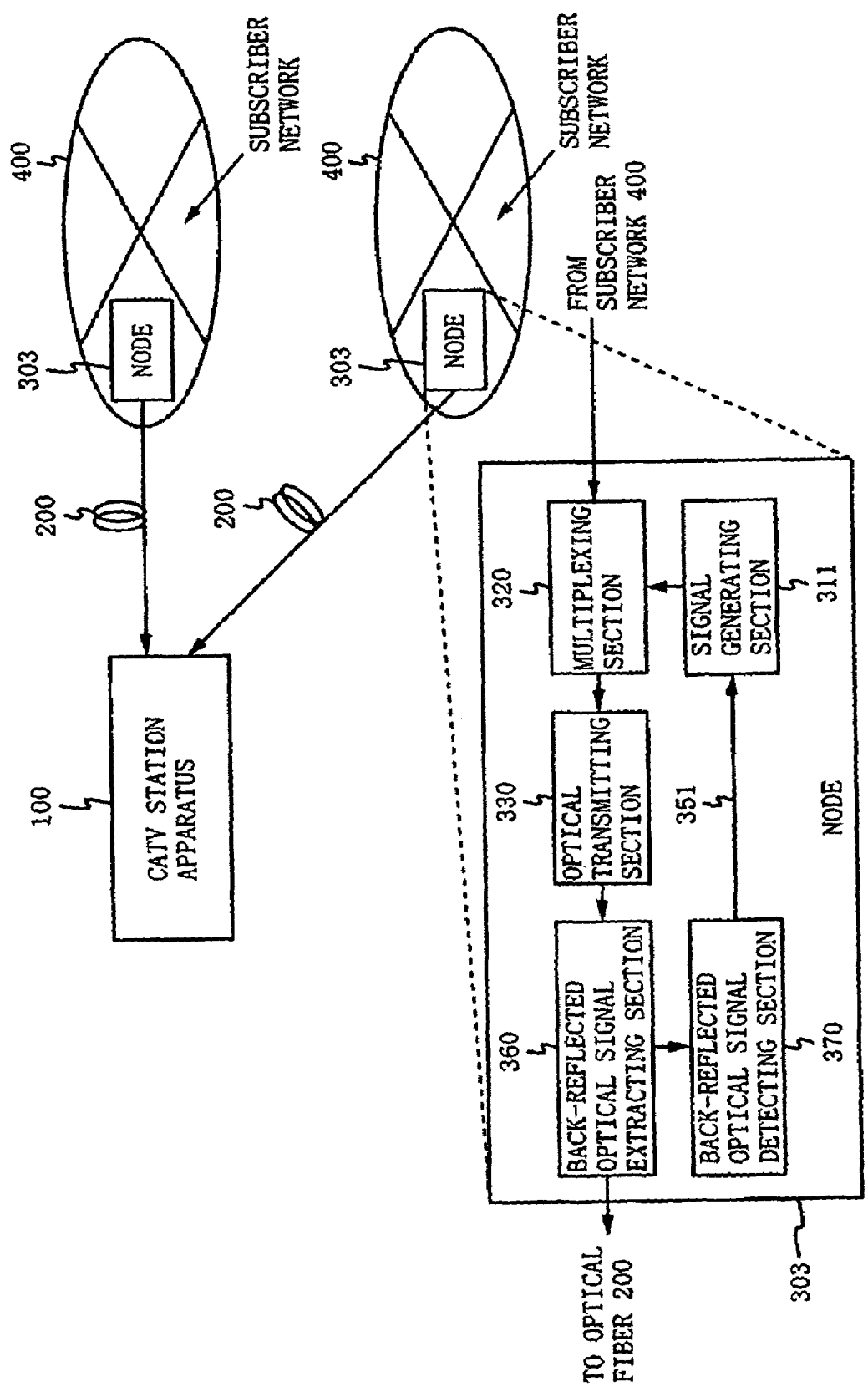

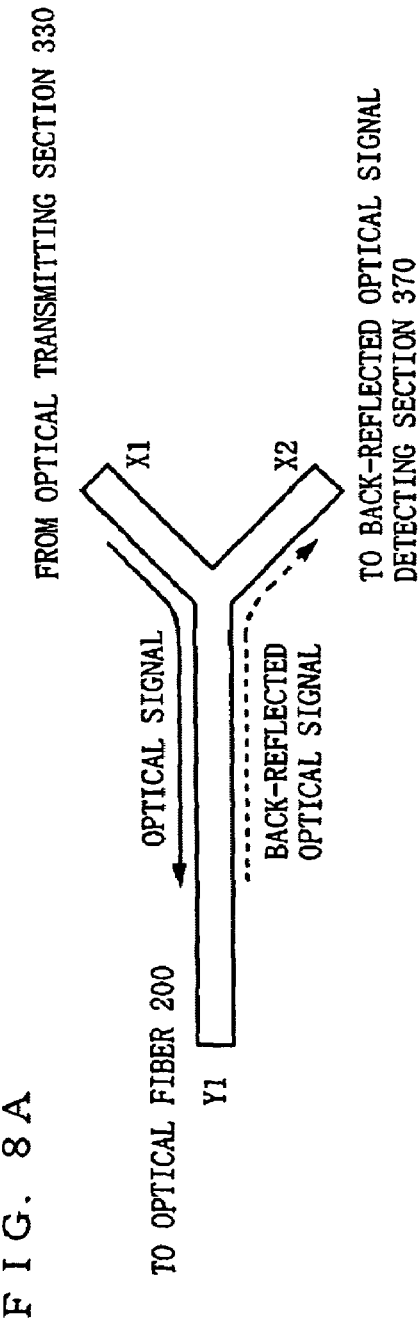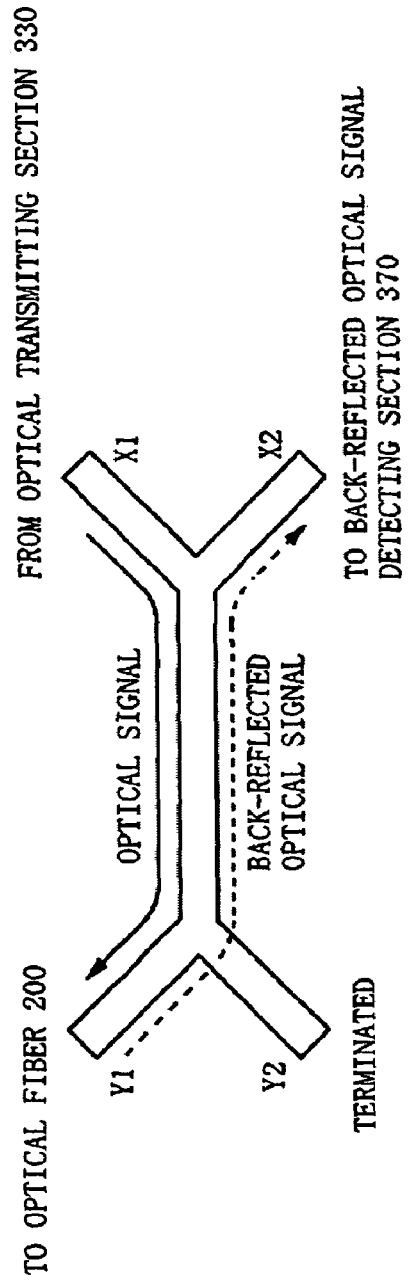

CATV UPLINK OPTICAL TRANSMISSION SYSTEM

BACKGROUND OF THE INVENTION

1. Field of the Invention

The present invention relates to an uplink optical transmission system included in a CATV system for performing bi-directional communications by using a bi-directional transmission line which is formed by connecting an optical fiber and a coaxial transmission line.

2. Description of the Background Art

Conventionally, it has been known that a network of a CATV (Cable Television) system can be constructed by using a bi-directional transmission line called an HFC (Hybrid Fiber Coax) which is formed by connecting an optical fiber and a coaxial transmission line. The HFC is disclosed in, for example, Japanese Patent Laid-Open Publication No. 11-284999 (1999-284999). For the purpose of achieving bi-directional communications between a CATV station and a plurality of subscriber devices, the CATV system using an HFC has a network structure in which each subscriber device belongs to any one of subscriber networks, and such subscriber networks are connected to the CATV station. The CATV station includes a CATV station apparatus, while each subscriber n network includes a node. The CATV station apparatus and each node are connected via an optical fiber as a trunk line, while the node and each subscriber device are connected via a coaxial transmission line as a distribution line. Particularly in recent years, the number of CATV providers using a CATV system with an HFC to provide Internet services is increasing.

FIG. 16 is an illustration showing the configuration of a conventional uplink optical transmission system included in a CATV system using an HFC. The system illustrated in FIG. 16 includes a CATV station apparatus 100, a plurality of optical fibers 200, a plurality of nodes 300, and a plurality of subscriber networks 400. The system allows access from subscriber terminals (not shown) connected to the subscriber networks 400. Each node 300 converts an electrical signal transmitted from a subscriber terminal via the corresponding subscriber network 400 to an optical signal for transmission via the corresponding optical fiber 200 to the CATV station apparatus 100.

The CATV station apparatus 100 includes a plurality of optical receiving sections 110, a plurality of signal separating sections 120, a coupling section 140, a demodulating section 150, and a cable modem termination system 160. The optical receiving sections 110 and the signal separating sections 120 correspond to the respective subscriber networks 400. Each of the optical receiving sections 110 receives an optical signal transmitted from the corresponding subscriber network 400 via the corresponding optical fiber 200 for conversion to an electrical signal. Each of the signal separating sections 120 separates the electrical signal output from the corresponding optical receiving section 110 into a data communication signal and other signals. The coupling section 140 couples a plurality of data communication signals output from the signal separating sections 120. The demodulating section 150 demodulates a signal output from the coupling section 140. The demodulated signal output from the demodulating section 150 is supplied as an uplink signal to the cable modem termination system 160.

In the above-described conventional CATV uplink optical transmission system, optical signals transmitted from the nodes 300 via the optical fibers 200 are individually converted to electrical signals, and these electrical signals are then coupled and demodulated. With such configuration, the subscriber networks 400 can share the single demodulating section 150. Therefore, by using the existing CATV system, Internet services can be provided at low cost.

However, the conventional CATV uplink optical transmission system has some drawbacks. For example, in the CATV station apparatus included in the above conventional system, a plurality of signals received by the plurality of optical receiving sections are coupled by the coupling section, and are then demodulated by the demodulating section. Therefore, the demodulating section may receive an aggregate of noise, for example, occurring at the subscriber networks. Such noise is called ingress noise, causing a problem in configuring the CATV uplink optical transmission system.

Moreover, particularly in recent years, for the purpose of expanding a service area covered by a single optical fiber, a optical transmitting section of higher output power than ever is used in some cases. It is generally known, however, that an optical signal of large power incident to an optical fiber causes a non-linear phenomenon typified by stimulated Brillouin scattering. Such a non-linear phenomenon greatly degrades noise characteristics of the optical transmission system.

In a downlink line of a CATV system, however, the above-described non-linear phenomenon typified by stimulated Brillouin scattering does not occur because of the following reason. In the downlink line, video signals always flow, and therefore optical signals passing through the optical fiber are always modulated. This makes the optical spectrum spread over a wide frequency band even with higher output power of the optical transmitting section, thereby not increasing the peak power of the spectrum by much. Also, in a general communications system, such as a point-to-point system, the above non-linear phenomenon, even if it occurs while no signal to be transmitted exists to increase noise, does not particularly pose a problem because no signal to be affected by the noise exists at all.

In an uplink line of the CATV system, on the other hand, a non-linear phenomenon does occur, which would not occur when a conventional optical transmitting section of low output power is used or when modulated light is output due to the existence of an uplink signal. In the uplink line, whilst monitor signals for monitoring the transmission line and, particularly in recent years, uplink signals from a cable modem are also transmitted, there yet occurs a period during which no signal exists (burst period). During such a period, unmodulated light is output from the optical transmitting section, causing the above non-linear phenomenon in the optical fiber. As described above, in the CATV uplink optical transmission system, a plurality of optical signals transmitted via a plurality of optical transmission systems are individually converted to electrical signals, and these electrical signals are then coupled. For this reason, noise occurring in one optical transmission system can considerably affect communications in other optical transmission systems.

SUMMARY OF THE INVENTION

Therefore, an object of the present invention is to provide a CATV uplink optical transmission system configured so as to prevent an influence of noise occurring in one optical transmission system due to the absence of an uplink signal, the influence being exerted upon communications performed by other optical transmission systems.

The present invention has the following features to attain the object mentioned above.

A first aspect of the present invention is directed to a CATV station apparatus included in a CATV system for performing bi-directional communications by using a bi-directional transmission line which is formed by connecting an optical fiber and a coaxial transmission line. The CATV station apparatus includes: at least one optical receiving section for receiving a signal transmitted through the optical fiber, and converting the received signal to an electrical signal; a signal processing section for performing a predetermined process on the signal output from the optical receiving section; at least one state detecting section for detecting a reception state of the optical receiving section; and at least one signal interrupting section provided between the optical receiving section and the signal processing section for interrupting, in accordance with the reception state detected by the state detecting section, a signal flow heading from the optical receiving section toward the signal processing section.

According to the above first aspect, even if noise occurs in one optical fiber, a signal from that optical fiber does not arrive at the signal processing section. Therefore, it is possible to prevent an influence of the noise occurring in one optical fiber, the influence being exerted upon communications performed by using other optical fibers.

Here, the state detecting section may include a received photocurrent monitoring section for detecting a received photocurrent at the optical receiving section, and the signal interrupting section may include an amplifying section for amplifying the signal output from the optical receiving section only when the detected received photocurrent is higher than a predetermined level, and outputting the amplified signal to the signal processing section. Alternatively, the state detecting section may include a received photocurrent monitoring section for detecting a received photocurrent at the optical receiving section, and the signal interrupting section may include a switching section for passing the signal output from the optical receiving section to the signal processing section only when the detected received photocurrent is higher than a predetermined level. Still alternatively, the state detecting section may include an uplink signal detecting section for detecting the presence or absence of an uplink signal included in the signal output from the optical receiving section, and the signal interrupting section may include an amplifying section for amplifying the signal output from the optical receiving section only when the uplink signal is detected, and outputting the amplified signal to the signal processing section. Still alternatively, the state detecting section may include an uplink signal detecting section for detecting the presence or absence of an uplink signal included in the signal output from the optical receiving section, and the signal interrupting section may include a switching section for passing the signal output from the optical receiving section to the signal processing section only when the uplink signal is detected. With any of the above configurations, it is possible to interrupt the flow of the signal heading from the optical receiving section to the signal processing section when the optical receiving section receives a optical signal with noise.

Moreover, the CATV station apparatus may further include at least one signal separating section provided between the optical receiving section and the signal interrupting section for separating the signal output from the optical receiving section into a data communication signal and other signals, and the uplink signal detecting section may detect the presence or absence of an uplink signal included in the data communication signal. With this, it is possible to interrupt the flow of the signal heading from the optical receiving section to the signal processing section even when only a signal other than the data communication signal exists as an uplink signal. Furthermore, the signal processing section may couple signals output from a plurality of said optical receiving sections, and may demodulate the resultant signal. With this, a process of coupling and demodulating the received signals can be correctly performed.

A second aspect of the present invention is directed to a node device included in a CATV system for performing bi-directional communications by using a bi-directional transmission line which is formed by connecting an optical fiber and a coaxial transmission line. The node device includes: a signal generating section for generating a predetermined signal; a coupling section for coupling a signal transmitted through the coaxial transmission line and the signal output from the signal generating section; and a optical transmitting section for converting a signal output from the coupling section to an optical signal, and sending the optical signal to the optical fiber.

According to the above second aspect, a new signal is added to the transmission signal. Therefore, even when no uplink signal exists, the node device outputs an optical signal which has always been modulated with a signal of some type. This prevents a non-linear phenomenon, which occurs when an optical signal of high power is input to the optical fiber. Therefore, the CATV station apparatus can prevent an influence of noise occurring in one optical fiber, the influence being exerted upon communications performed by using other optical fibers.

Here, the node device may further include an uplink signal detecting section for detecting the presence or absence of an uplink signal included in the signal transmitted through the coaxial transmission line, and the signal generating section may output the generated signal only when the uplink signal is not detected. Alternatively, the node device may further include a back-reflected optical signal extracting section for extracting a back-reflected optical signal from the optical fiber; and a back-reflected optical signal detecting section for detecting a signal level of the back-reflected optical signal, wherein the signal generating section outputs the generated signal only when the signal level of the back-reflected optical signal is higher than a predetermined level. Still alternatively, the node device may further include a back-reflected optical signal extracting section for extracting a back-reflected optical signal from the optical fiber; a back-reflected optical signal detecting section for detecting a signal level of the back-reflected optical signal; and a gain-variable amplifying section for switching a gain in accordance with the signal level of the back-reflected optical signal, and amplifying the signal generated by the signal generating section, wherein the coupling section may couple the signal transmitted through the coaxial transmission line and the signal amplified by the gain-variable amplifying section. With any of the above configurations, the generated signal is added only in a predetermined case, thereby effectively utilizing the optical modulation index.

Furthermore, the back-reflected optical signal extracting section may include an optical coupling section having an asymmetric optical coupling ratio between contacts provided therein, and the back-reflected optical signal detecting section is connected to one of the contacts that has a smaller value of the optical coupling ratio. With this, the back-reflected optical signal extracting section can be easily constructed. Still further, a frequency of the signal generated by the signal generating section may be within a frequency band outside a frequency band of the uplink signal included in the signal transmitted through the coaxial transmission line. With this, the CATV station apparatus can easily perform a process of separation into the uplink signal and the signal added by the node device.

A third aspect of the present invention is directed to a node device included in a CATV system for performing bi-directional communications by using a bi-directional transmission line which is formed by connecting an optical fiber and a coaxial transmission line. The node device includes: a optical transmitting section provided with a light source and a light source driving section for sending, through the optical fiber, an optical signal which is based on a signal transmitted through the coaxial transmission line; and a state detecting section for detecting a transmission state of the optical transmitting section, wherein the light source driving section controls a bias current to be supplied to the light source in accordance with the transmission state detected by the state detecting section.

According to the above third aspect, it is determined, in accordance with the detected transmission state, whether the optical signal should be transmitted. When transmission should be inhibited, the bias current to be supplied to the light source is lowered. This prevents a non-linear phenomenon, which occurs when an optical signal of high power is input to the optical fiber. Therefore, the CATV station apparatus can prevent an influence of noise occurring in one optical fiber, the influence being exerted upon communications performed by using other optical fibers. Furthermore, with the bias current to be supplied to the light source being lowered, power consumption of the node device can be reduced.

Here, the state detecting section may include an uplink signal detecting section for detecting the presence or absence of an uplink signal included in the signal transmitted through the coaxial transmission line, and only when the uplink signal is detected, the light source driving section may supply the light source with a bias current at a level sufficient for performing optical communications. Alternatively, the state detecting section may include a back-reflected optical signal extracting section for extracting a back-reflected optical signal from the optical fiber, and a back-reflected optical signal detecting section for detecting a signal level of the back-reflected optical signal, and only when the signal level of the back-reflected optical signal is lower than a predetermined level, the light source driving section may supply the light source with a bias current at a level sufficient for performing optical communications. With any of the above configurations, the bias current to be supplied to the light source is lowered in a predetermined case. Thus, it is possible to prevent a non-linear phenomenon in the optical fiber, and also to reduce power consumption of the nod device.

Furthermore, the back-reflected optical signal extracting section may include an optical coupling section having an asymmetric optical coupling ratio between contacts provided therein, and the back-reflected optical signal detecting section is connected to one of the contacts that has a smaller value of the optical coupling ratio. With this, the back-reflected optical signal extracting section can be easily constructed. Furthermore, when it is determined in accordance with the transmission state detected by the state detecting section that transmission of the optical signal should be inhibited, the light source driving section may supply the light source with a bias current at a level lower than an electric current level which causes stimulated Brillouin scattering due to an optical signal output from the light source. With such configuration, when transmission of the optical signal should be inhibited, the bias current to be supplied to the light source is lowered below the level which causes stimulated Brillouin scattering in the optical fiber. Therefore, it is possible to prevent the occurrence of Stimulated Brillouin scattering in the optical fiber.

A fourth aspect of the present invention is directed to an uplink optical transmission system included in a CATV system for performing bi-directional communications by using a bi-directional transmission line which is formed by connecting an optical fiber and a coaxial transmission line. The uplink optical transmission system includes: a node device; and a CATV station apparatus. The node device includes: a signal generating section for generating a predetermined additional signal in accordance with a control signal; a coupling section for coupling a signal transmitted through the coaxial transmission line and the signal output from the signal generating section; a optical transmitting section for converting a signal output from the coupling section to an optical signal, and sending the optical signal to the optical fiber; and a state detecting section for detecting a transmission state of the optical transmitting section, and outputting the control signal. The CATV station apparatus includes: at least one optical receiving section for receiving a signal transmitted through the optical fiber, and converting the received signal to an electrical signal; a signal processing section for performing a predetermined process on the signal output from the optical receiving section; at least one additional signal detecting section for detecting the presence or absence of the additional signal included in the electrical signal output from the optical receiving section; and at least one signal interrupting section provided between the optical receiving section and the signal processing section for interrupting, when the additional signal is detected, a signal flow heading from the optical receiving section toward the signal processing section.

According to the above fourth aspect, the additional signal is added when no uplink signal exists. Therefore, the node device outputs an optical signal which has always been modulated with a signal of some type. This prevents a non-linear phenomenon, which occurs when an optical signal of high power is input to the optical fiber. Also, in the CATV station apparatus, the signal added with the additional signal does not reach the signal processing section. Therefore, even when noise other than the noise accompanied by the above-stated non-linear phenomenon occurs in one optical fiber, it is possible to prevent an influence of the occurring noise upon communications performed by using other optical fibers. Furthermore, the additional signal detecting section for detecting a signal added by the node device can be easily constructed.

Here, the state detecting section may include an uplink signal detecting section for detecting the presence or absence of an uplink signal included in the signal transmitted through the coaxial transmission line, and the signal generating section may output the additional signal only when the uplink signal is not detected. Alternatively, the state detecting section may include a back-reflected optical signal extracting section for extracting a back-reflected optical signal from the optical fiber and a back-reflected optical signal detecting section for detecting a signal level of the back-reflected optical signal, and the signal generating section may output the additional signal only when the signal level of the back-reflected optical signal is higher than a predetermined level. With any of the above configurations, an additional signal is added in a predetermined case. This prevents a non-linear phenomenon, which occurs when an optical signal of high power is input to the optical fiber. Still alternatively, the back-reflected optical signal extracting section may include an optical coupling section having an asymmetric optical coupling ratio between contacts provided therein, and the back-reflected optical signal detecting section is connected to one of the contacts that has a smaller value of the optical coupling ratio. With this, the back-reflected optical signal extracting section can be easily constructed.

Still alternatively, the signal interrupting section includes an amplifying section for amplifying the signal output from the optical receiving section only when the additional signal is not detected, and outputting the amplified signal to the signal processing section. Still alternatively, the signal interrupting section may include a switching section for passing the signal output from the optical receiving section to the signal processing section only when the additional signal is not detected. With any of the above configurations, the amplifying section (or the switching section) is controlled based on the presence or absence of the additional signal. Therefore, the signal flow heading from the optical receiving section to the signal processing section can be controlled. Furthermore, a frequency of the signal generated by the signal generating section may be within a frequency band outside a frequency band of the uplink signal included in the signal transmitted by using the coaxial transmission line. With this, the CATV station apparatus can easily perform a process of separation into the uplink signal and the signal added by the node device. Still further, the signal processing section may couple signals output from a plurality of the optical receiving sections, and demodulate the resultant signal. With this, a process of coupling and demodulating the received signals can be correctly performed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is an illustration showing the configuration of a CATV uplink optical transmission system according to a fifth embodiment of the present invention;

FIG. 6 is an illustration showing the configuration of a CATV uplink optical transmission system according to a sixth embodiment of the present invention;

FIG. 7 is an illustration showing the configuration of a CATV uplink optical transmission system according to a seventh embodiment of the present invention;

FIGS. 8A and 8B are illustrations showing specific examples of a back-reflected optical signal extracting section of CATV uplink optical transmission systems according to the seventh, eighth, tenth, twelfth, and fourteenth embodiments of the present invention;

DESCRIPTION OF THE PREFERRED EMBODIMENTS

With reference to FIGS. 1 through 15, CATV uplink optical transmission systems according to embodiments of the present invention are described below. Each of these systems includes a CATV station apparatus and a plurality of nodes, allowing Internet access from subscriber devices connected to subscriber networks. Note that, although the CATV uplink optical transmission system of each embodiment includes one CATV station apparatus, two optical fibers, two nodes, and two subscriber networks, this is not meant to be restrictive. The number of optical fibers, nodes, and subscriber networks is arbitrary.

First Embodiment

Figure 1:
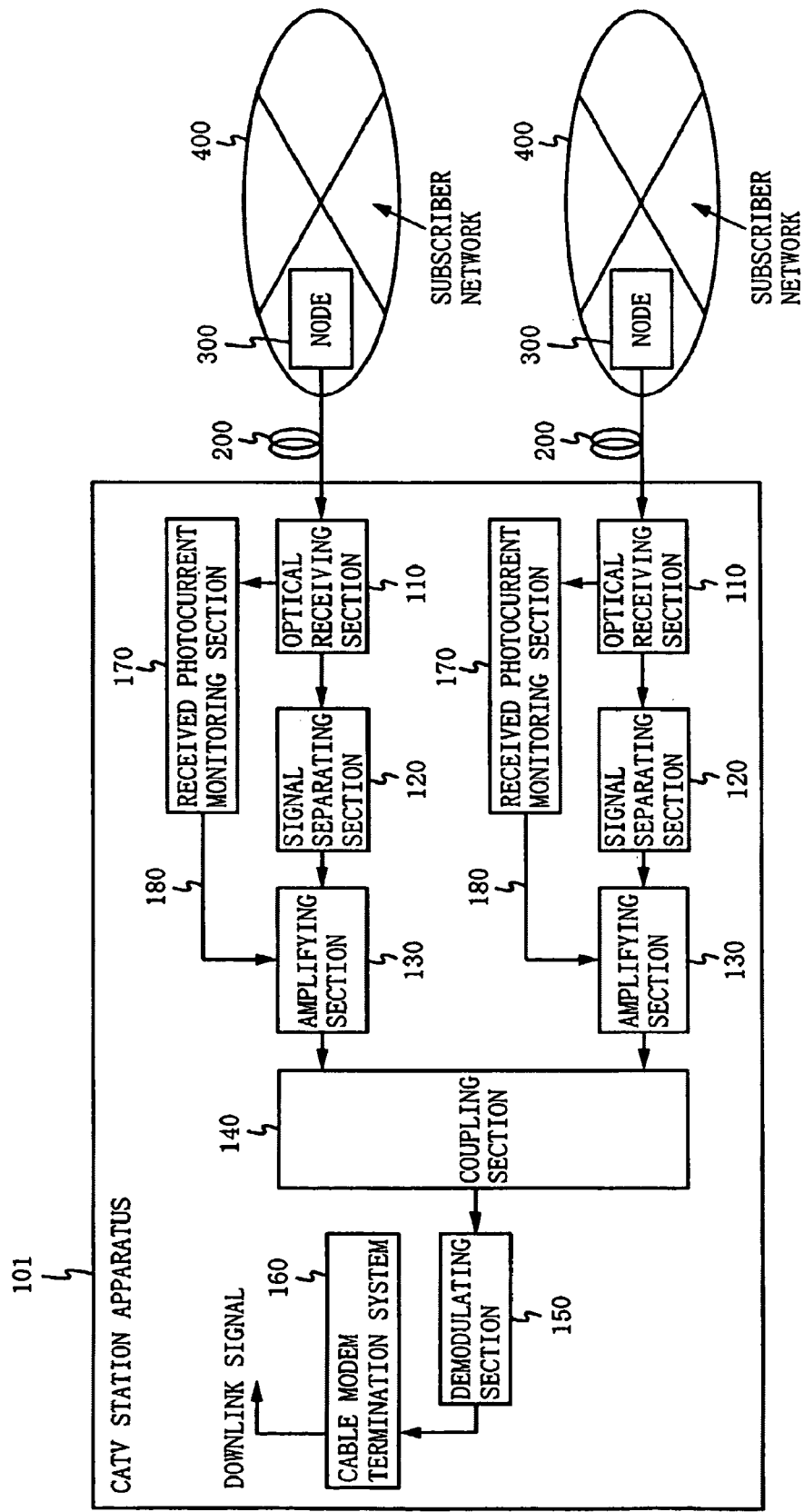
FIG. 1 is an illustration showing the configuration of a CATV uplink optical transmission system according to a first embodiment of the present invention.

FIG. 1 is an illustration showing the configuration of a CATV uplink optical transmission system according to a first embodiment of the present invention. The system illustrated in FIG. 1 includes a CATV station apparatus 101, a plurality of optical fibers 200, a plurality of nodes 300, and a plurality of subscriber networks 400. Each of the subscriber networks 400 is a coaxial network for signal transmission using a coaxial transmission line, and is connected via the corresponding node 300 and the corresponding optical fiber 200 to the CATV station apparatus 101.

Each of the nodes 300 converts a signal transmitted from a subscriber device (not shown) connected to the corresponding subscriber network 400 to an optical signal, and then transmits the optical signal via the optical fiber 200 to the CATV station apparatus 101. The node 300 according to the present embodiment is the same as the node included in the above-described conventional CATV uplink optical transmission system.

The CATV station apparatus 101 is typically located in a CATV station. The CATV station apparatus 101 includes a plurality of optical receiving sections 110, a plurality of signal separating sections 120, a plurality of amplifying sections 130, a coupling section 140, a demodulating section 150, a cable modem termination system 160, and a plurality of received photocurrent monitoring sections 170. Each subscriber network corresponds to one optical receiving section 110, one signal separating section 120, one amplifying section 130, and one received photocurrent monitoring section 170.

The optical receiving section 110 receives an optical signal transmitted via the optical fiber 200 from the subscriber network 400, and then converts the received optical signal to an electrical signal. The signal separating section 120 separates the electrical signal output from the optical receiving section 110 into a data communication signal and other signals. The amplifying section 130 amplifies the data communication signal output from the signal separating section 120 in accordance with a control signal 180 output from the received photocurrent monitoring section 170, which will be described further below. The coupling section 140 couples a plurality of signals output from the amplifying sections 130 (amplified data communication signals). The demodulating section 150 demodulates a signal output from the coupling section 140. The demodulated signal output from the demodulating section 150 is supplied as an uplink signal to the cable modem termination system 160. Note that a downlink signal output from the cable modem termination system 160 is transmitted via a means (not shown) to the subscriber device connected to the subscriber network 400.

The received photocurrent monitoring section 170 outputs the control signal 180 based on a received photocurrent at the optical receiving section 110. In more detail, the received photocurrent monitoring section 170 compares a received photocurrent level at the optical receiving section 110 with a predetermined reference current level. If the received photocurrent level is equal to or higher than the reference current level, the value of the control signal 180 is set as 1, for example, so as to turn the amplifying section 130 to ON state (operating state). If the received photocurrent level is lower than the reference current level, on the other hand, the received photocurrent monitoring section 170 sets the value of the control signal 180 as 0, for example, so as to turn the amplifying section 130 to OFF state (non-operating state).

If the control signal 180 represents 1 (that is, if the received photocurrent level is equal to or higher than the reference current level), the amplifying section 130 amplifies the signal output from the signal separating section 120 at a predetermined amplifying ratio. The amplifying ratio for use in this case is determined so that the amplified signal is significant in the subsequent process. If the control signal 180 represents 0 (that is, if the received photocurrent level is lower than the reference current level), on the other hand, the amplifying section 130 does not amplify the signal output from the signal separating section 120, and outputs a signal which does not affect, even after being coupled, communications performed by other optical transmission systems.

In the system illustrated in FIG. 1, in each subscriber network 400, data communication signals transmitted from the subscriber devices and signals for monitoring the transmission line or the like are frequency-multiplexed. A signal obtained through frequency multiplexing goes, as an optical signal, through the corresponding node 300 and optical fiber 200 to the CATV station apparatus 101. The optical signal arriving at the CATV station apparatus 101 is converted to an electrical signal by the corresponding optical receiving section 110 provided for each subscriber network 400. The electrical signal is separated by the corresponding signal separating section 120 into a data communication signal and other signals. The data communication signal obtained through separation is amplified by the corresponding amplifying section 130, and is then coupled by the coupling section 140 with other data communication signals received from other subscriber networks 400. A signal obtained through coupling is demodulated by the demodulating section 150, and is supplied as an uplink signal to the cable modem termination system 160.

Apart from the above-described signal flow, each received photocurrent monitoring section 170 monitors a received photocurrent at the corresponding optical receiving section 110. If the received photocurrent level is equal to or higher than the reference current level, the received photocurrent monitoring section 170 determines that an uplink signal exists and therefore no stimulated Brillouin scattering has occurred in the optical fiber. If the received photocurrent level is lower than the reference current level, the received photocurrent monitoring section 170 determines that no uplink signals exist and therefore stimulated Brillouin scattering may occur. In the former case, the amplifying section 130 is controlled so as to be in ON state. In the latter case, the amplifying section 130 is controlled so as to be in OFF state. Also in the latter case, the amplifying section 130 outputs a signal at a level which does not affect, even after being coupled, communications performed by other optical transmission systems.

Therefore, according to the CATV uplink optical transmission system of the present embodiment, even if excessive noise has occurred in one optical transmission system affected by stimulated Brillouin scattering which occurs due to the absence of an uplink signal, it is possible to prevent an influence of that noise upon communications performed by other optical transmission systems.

Note that the CATV uplink optical transmission system according to the present embodiment is operated with various conditions (for example, specifications of a light source included in each node 300) being set so as to prevent stimulated Brillouin scattering from occurring in the optical fiber when uplink signals of one or more channels are transmitted.

Second Embodiment

Figure 2:
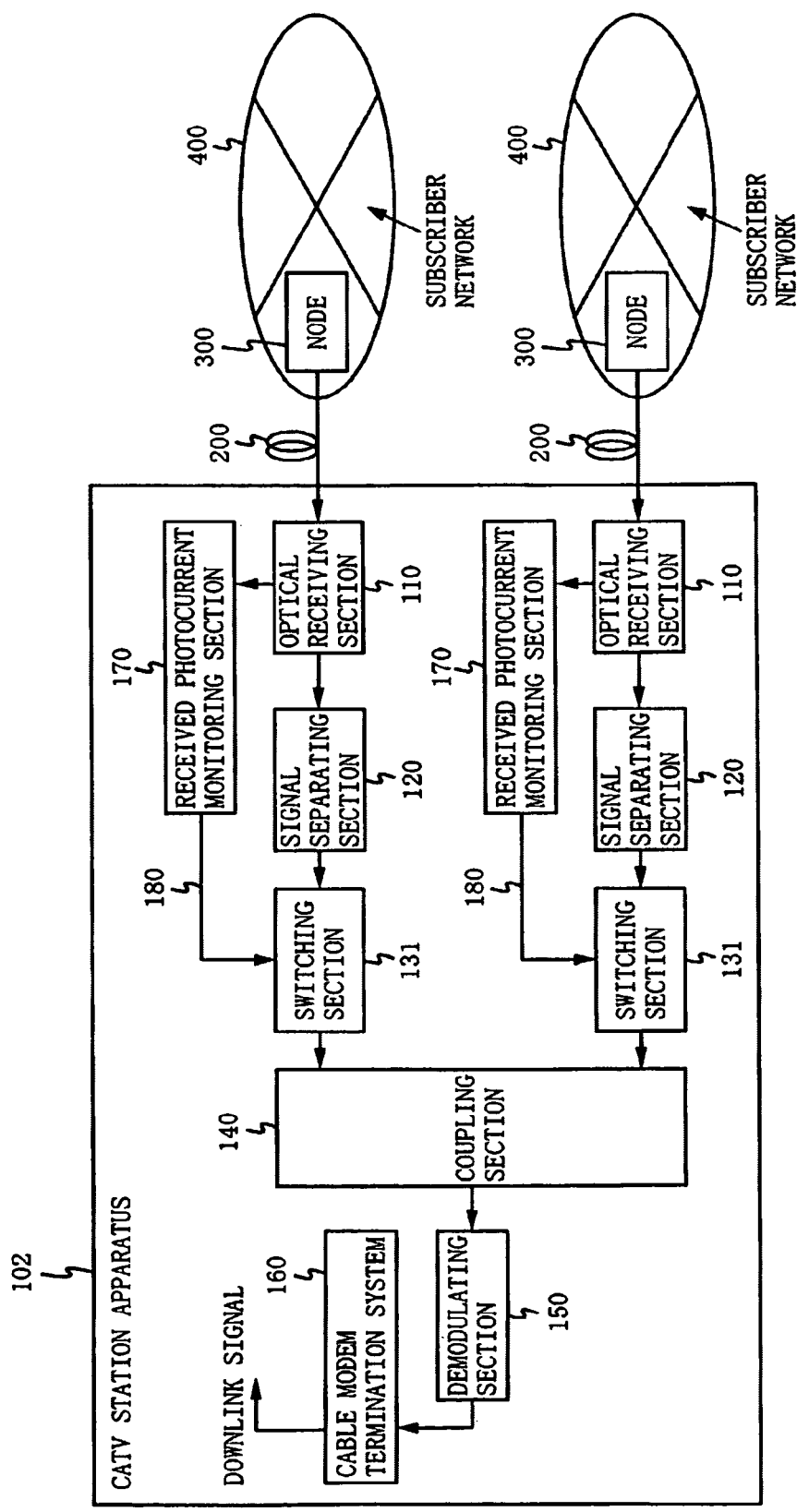
FIG. 2 is an illustration showing the configuration of a CATV uplink optical transmission system according to a second embodiment of the present invention.

FIG. 2 is an illustration showing the configuration of a CATV uplink optical transmission system according to a second embodiment of the present invention. The system illustrated in FIG. 2 includes a CATV station apparatus 102, a plurality of optical fibers 200, a plurality of nodes 300, and a plurality of subscriber networks (coaxial networks) 400. In the present embodiment, components that are the same as those in the first embodiment are provided with the same reference numerals, and are not described herein.

The CATV station apparatus 102 is similar in function to the CATV station apparatus 101 according to the first embodiment, except that the amplifying sections 130 are replaced by switching sections 131.

Each of the switching sections 131 switches a transmission path for the data communication signal output from the corresponding signal separating section 120 in accordance with the control signal 180 output from the corresponding received photocurrent monitoring section 170. In more detail, if the control signal 180 represents 1 (that is, if the received photocurrent level is equal to or higher than the reference current level), the switching section 131 passes the data communication signal output from the signal separating section 120 to the coupling section 140. If the control signal 180 represents 0 (that is, if the received photocurrent level is lower than the reference current level), on the other hand, the switching section 131 interrupts the signal transmission path from the signal separating section 120 to the coupling section 140 in order not to pass the data communication signal output from the signal separating section 120 to the coupling section 140. The coupling section 140 couples signals output from the switching sections 131.

In the system illustrated in FIG. 2, as with the first embodiment, a signal obtained at each subscriber network through frequency multiplexing goes, as an optical signal, to the CATV station apparatus 102, and the optical signal arriving at the CATV station apparatus 102 is subjected to processes of optical-electrical conversion, signal separation, coupling, and demodulation in sequence. Also, the received photocurrent monitoring section 170 monitors the received photocurrent at the optical receiving section 110.

If the received photocurrent level is equal to or higher than the reference current level, the switching section 131 is controlled so as to allow the signal to pass. If the received photocurrent level is lower than the reference current level, on the other hand, the switching section 131 is controlled so as to interrupt the transmission path. In the latter case, the transmission path for a signal heading from the signal separating section 120 toward the coupling section 140 is interrupted.

Therefore, according to the CATV uplink optical transmission system of the present embodiment, even if excessive noise has occurred in one optical transmission system affected by stimulated Brillouin scattering which occurs due to the absence of an uplink signal, it is possible to prevent an influence of that noise upon communications performed by other optical transmission systems.

Although the CATV station apparatus 102 illustrated in FIG. 2 does not include an amplifying section for amplifying an electrical signal, such an amplifying section can be provided at an arbitrary location on a path from each optical receiving section 110 to the cable modem termination system 160. The same goes for CATV uplink optical transmission systems according to fourth, twelfth, and fourteenth embodiments, which will be described further below, as well as the second embodiment, those systems not including an amplifying section on the path from each optical receiving section 110 to the cable modem termination system 160.

Third Embodiment

Figure 3:
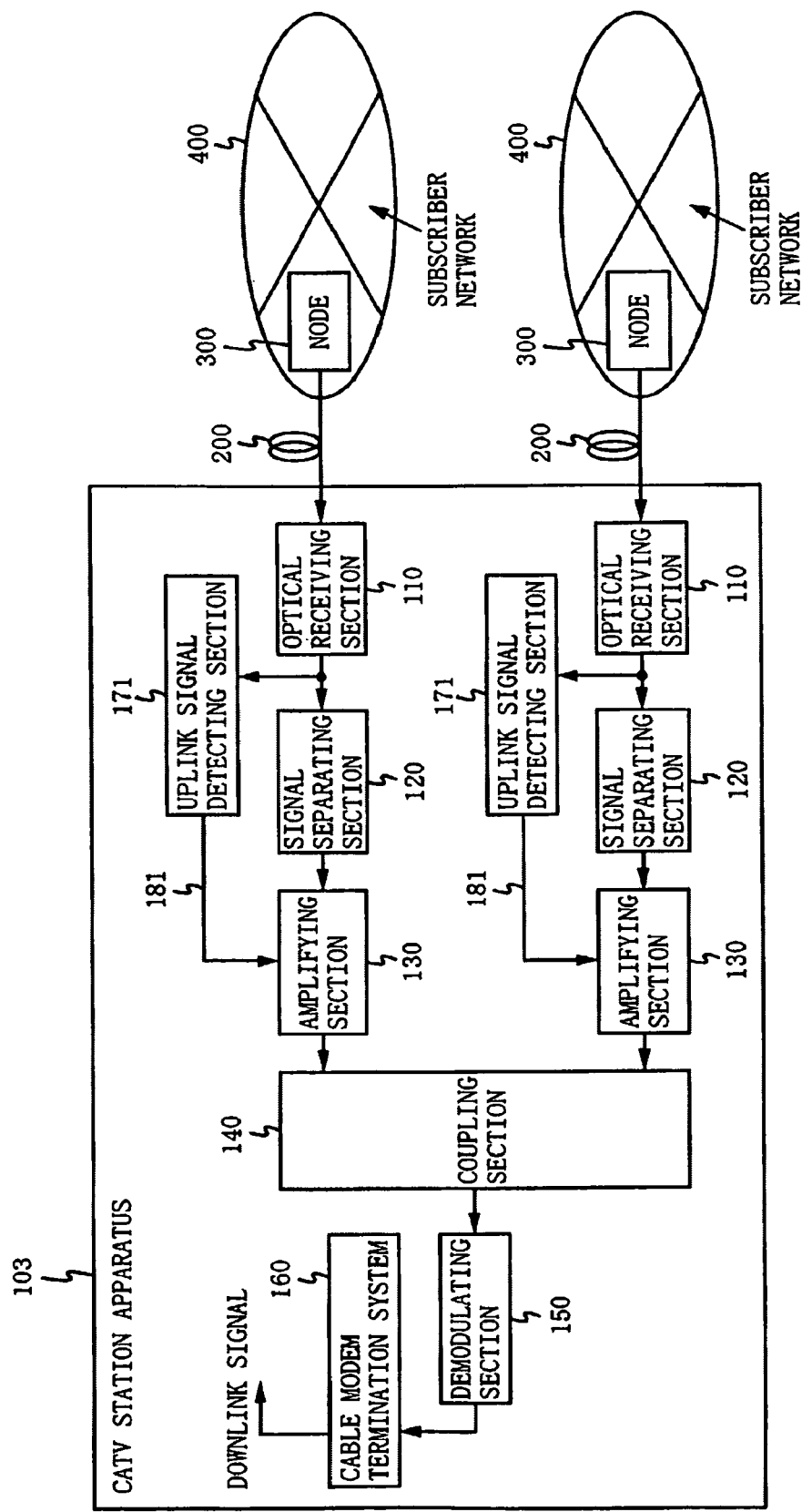
FIG. 3 is an illustration showing the configuration of a CATV uplink optical transmission system according to a third embodiment of the present invention.

FIG. 3 is an illustration showing the configuration of a CATV uplink optical transmission system according to a third embodiment of the present invention. The system illustrated in FIG. 3 includes a CATV station apparatus 103, a plurality of optical fibers 200, a plurality of nodes 300, and a plurality of subscriber networks (coaxial networks) 400. In the present embodiment, components that are the same as those in the first embodiment are provided with the same reference numerals, and are not described herein.

The CATV station apparatus 103 is similar in function to the CATV station apparatus 101 according to the first embodiment, except that the received photocurrent monitoring sections 170 are replaced by uplink signal detecting sections 171.

Each of the uplink signal detecting sections 171 detects the presence or absence of an uplink signal included in the electrical signal output from the optical receiving section 110, and then outputs a control signal 181 indicative of the presence or absence of an uplink signal. In more detail, the uplink signal detecting section 171 performs a process of detecting an envelope of the electrical signal output from the optical receiving section 110. If an uplink signal is detected, the uplink signal detecting section 171 sets the value of the control signal 181 as 1, for example, so as to turn the corresponding amplifying section 130 to ON state. If no uplink signal is detected, on the other hand, the uplink signal detecting section 171 sets the value of the control signal 181 as 0, for example, so as to turn the amplifying section 130 to OFF state. In accordance with the control signal 181 output from the uplink signal detecting section 171, the amplifying section 130 amplifies the data communication signal output from the corresponding signal separating section 120.

Therefore, as with the first embodiment, according to the CATV uplink optical transmission system of the present embodiment, even if excessive noise has occurred in one optical transmission system affected by stimulated Brillouin scattering which occurs due to the absence of an uplink signal, it is possible to prevent the influence of that noise upon communications performed by other optical transmission systems.

In the CATV station apparatus 103 illustrated in FIG. 3, the uplink signal detecting section 171 detects the presence or absence of an uplink signal included in the electrical signal output from the optical receiving section 110. This is not meant to be restrictive. Alternatively, the uplink signal detecting section can perform a process of detecting an uplink signal on a signal at an arbitrary point located from the optical receiving section 110 to the amplifying section 130. Particularly, if the CATV station apparatus is configured so that a signal at a stage subsequent to the signal separating section 120 is subjected to the above uplink signal detecting process, it is possible to detect the presence or absence of a data communication signal. With such a configuration, the amplifying section 130 can be set to OFF state even when only a signal other than a data communication signal, such as a signal for monitoring the transmission line, exists as an uplink signal.

Fourth Embodiment

Figure 4:
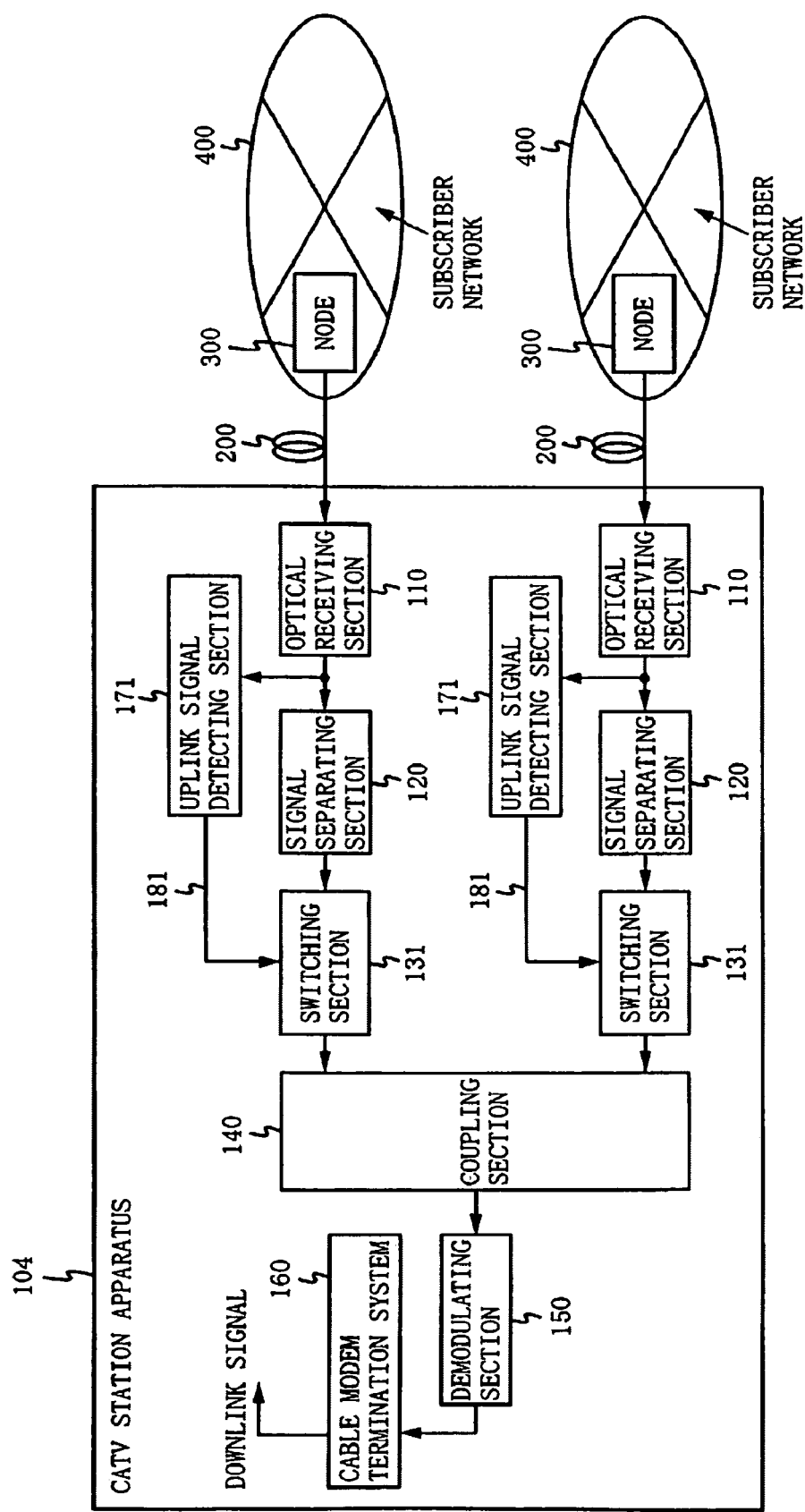
FIG. 4 is an illustration showing the configuration of a CATV uplink optical transmission system according to a fourth embodiment of the present invention.

FIG. 4 is an illustration showing the configuration of a CATV uplink optical transmission system according to a fourth embodiment of the present invention. The system illustrated in FIG. 4 includes a CATV station apparatus 104, a plurality of optical fibers 200, a plurality of nodes 300, and a plurality of subscriber networks (coaxial networks) 400. In the present embodiment, components that are the same as those in the third embodiment are provided with the same reference numerals, and are not described herein.

The CATV station apparatus 104 is similar in function to the CATV station apparatus 103 according to the third embodiment, except that the amplifying sections 130 are replaced by switching sections 131.

Each of the switching sections 131 switches a transmission path for the data communication signal output from the corresponding signal separating section 120 in accordance with the control signal 181 output from the corresponding uplink signal detecting section 171. In more detail, if the control signal 181 represents 1 (that is, if an uplink signal is detected), the switching section 131 passes the data communication signal output from the signal separating section 120 to the coupling section 140. If the control signal 181 represents 0 (that is, if no uplink signal is detected), on the other hand, the switching section 131 interrupts the signal transmission path from the signal separating section 120 to the coupling section 140 in order not to pass the data communication signal output from the signal separating section 120 to the coupling section 140. The coupling section 140 couples signals output from the switching sections 131.

Therefore, as with the third embodiment, according to the CATV uplink optical transmission system of the present embodiment, even if excessive noise has occurred in one optical transmission system affected by stimulated Brillouin scattering which occurs due to the absence of an uplink signal, it is possible to prevent an influence of that noise upon communications performed by other optical transmission systems.

Also, in the present embodiment, as with the third embodiment, the uplink signal detecting section can perform a process of detecting an uplink signal on a signal at an arbitrary point located from the optical receiving section 110 to the switching section 131. Furthermore, as with the third embodiment, by using the uplink signal detecting section configured so as to perform the above uplink signal detecting process on a signal at a stage subsequent to the signal separating section 120, the switching section 131 can be set to be in a state of interrupting the signal transmission path even when only a signal other than a data communication signal, such as a signal for monitoring the transmission line, exists as an uplink signal.

Fifth Embodiment

FIG. 5 is an illustration showing the configuration of a CATV uplink optical transmission system according to a fifth embodiment of the present invention. The system illustrated in FIG. 5 includes a CATV station apparatus 100, a plurality of optical fibers 200, a plurality of nodes 301, and a plurality of subscriber networks (coaxial networks) 400. In the present embodiment, components that are the same as those in the first embodiment are provided with the same reference numerals, and are not described herein.

Figure 16:
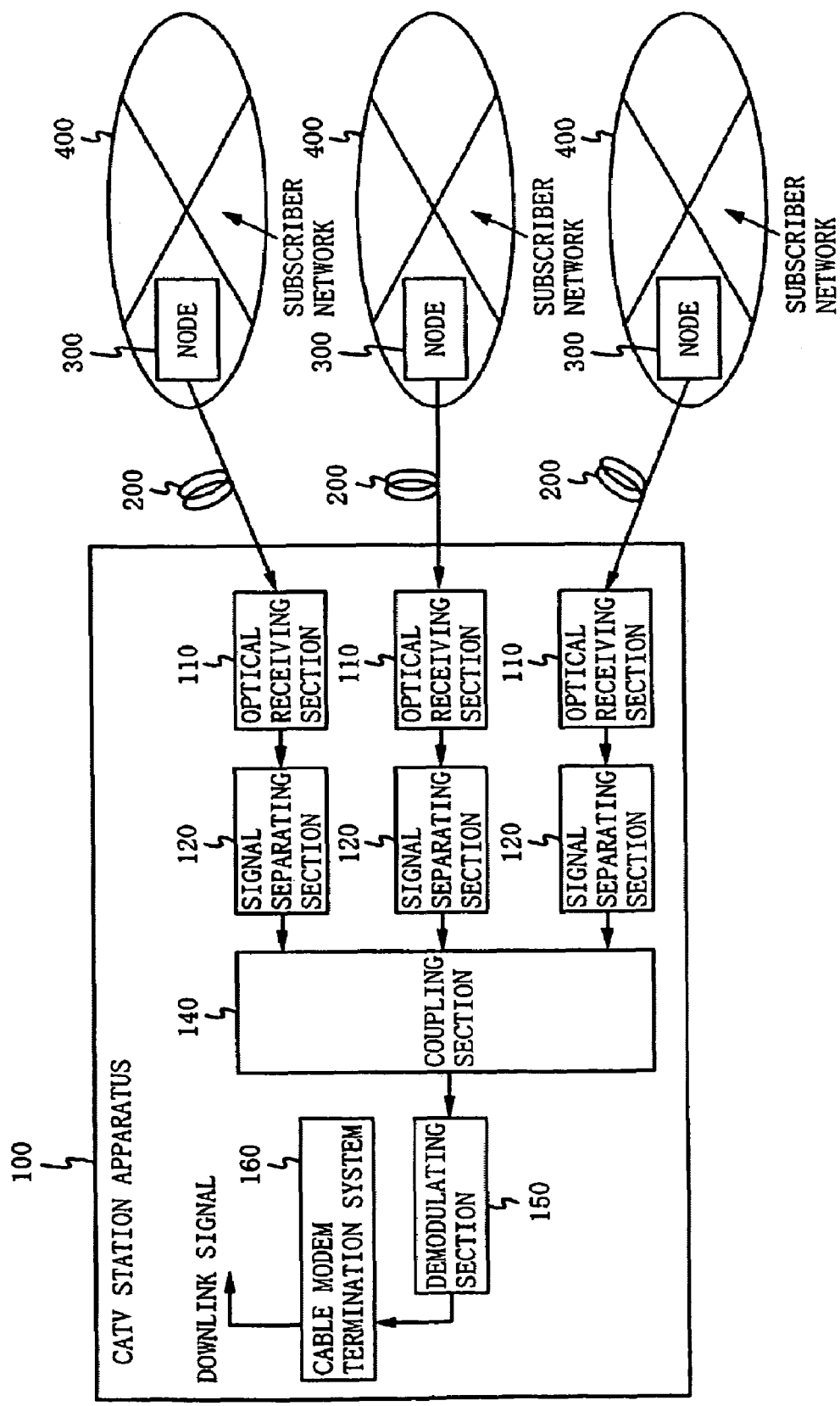
FIG. 16 is an illustration showing the configuration of a conventional CATV uplink optical transmission system.

The CATV station apparatus 100 is the same as the CATV station apparatus included in the conventional uplink optical transmission system (refer to FIG. 16) for performing, on optical signals transmitted from the subscriber networks 400 via the optical fibers 200, processes of optical-electrical conversion, signal separation, coupling, and demodulation in sequence.

Each of the nodes 301 converts an optical signal transmitted from a subscriber device (not shown) connected to the corresponding subscriber network 400 to an optical signal, and then transmits the optical signal via the optical fiber 200 to the CATV station apparatus 100. The node 301 includes a signal generating section 310, a multiplexing section 320, and a optical transmitting section 330. The signal generating section 310 generates a predetermined signal (a sine-wave signal, for example) for coupling with a signal heading from the subscriber network 400 toward the CATV station apparatus 100. The multiplexing section 320 frequency-multiplexes the signal heading from the subscriber network 400 toward the CATV station apparatus 100 and the signal generated by the signal generating section 310. The optical transmitting section 330 converts an electrical signal output from the multiplexing section 320 to an optical signal, and then transmits the optical signal via the optical fiber 200 to the CATV station apparatus 100.

In the system illustrated in FIG. 5, in the multiplexing section 320, the signal heading from the subscriber network 400 toward the CATV station apparatus 100 and the signal generated by the signal generating section 310 are frequency-multiplexed. The signal obtained through frequency multiplexing is converted by the optical transmitting section 330 to an optical signal, and then the optical signal after conversion is transmitted via the optical fiber 200 to the CATV station apparatus 100. Therefore, even if the signal heading from the subscriber network 400 toward the CATV station apparatus 100 does not include any uplink signal, the optical signal to be transmitted from the node 301 has been at least modulated with the signal generated by the signal generating section 310. As such, the optical signal passing through the optical fiber 200 has always been modulated with a signal of some type. For this reason, it is possible to prevent a non-linear phenomenon, such as stimulated Brillouin scattering, from occurring in the optical fiber 200.

Therefore, according to the CATV uplink optical transmission system of the present embodiment, it is possible to prevent excessive noise from occurring in the optical transmission system affected by stimulated Brillouin scattering which occurs due to the absence of an uplink signal. It is also possible to prevent an influence of noise occurring in one optical transmission system, the influence being exerted upon communications performed by other optical transmission systems.

Note that the frequency of the signal generated by the signal generating section 310 is preferably within a frequency band outside the frequency band of the uplink signal, and more preferably, lower than the frequency band of the uplink signal. The same goes for CATV uplink optical transmission systems according to sixth through eighth and eleventh through fourteenth embodiments, which will be described further below, as well as the fifth embodiment, those systems including a node provided with a signal generating section.

Furthermore, although the node 301 illustrated in FIG. 5 does not include an amplifying section for amplifying the signal generated by the signal generating section 310, such an amplifying section is required if the level of the signal generated by the signal generating section 310 is low. The same goes for CATV optical transmission systems according to sixth, seventh, and eleventh through fourteenth embodiments, which will be described further below, as well as the fifth embodiment, those systems including a node provided with a signal generating section but not with an amplifying section.

Sixth Embodiment

FIG. 6 is an illustration showing the configuration of a CATV uplink optical transmission system according to a sixth embodiment of the present invention. The system illustrated in FIG. 6 includes a CATV station apparatus 100, a plurality of optical fibers 200, a plurality of nodes 302, and a plurality of subscriber networks (coaxial networks) 400. In the present embodiment, components that are the same as those in the fifth embodiment are provided with the same reference numerals, and are not described herein.

Each of the nodes 302 is similar in function to each of the nodes 301 according to the fifth embodiment, except that the signal generating section 310 is replaced by a signal generating section 311 and that an uplink signal detecting section 340 is further provided.

The uplink signal detecting section 340 detects the presence or absence of an uplink signal included in a signal heading from the subscriber network 400 to the CATV station apparatus 100, and then outputs a control signal 350 indicative of the presence or absence of an uplink signal. In more detail, the uplink signal detecting section 340 performs a process of detecting an envelope of the signal heading from the subscriber network 400 to the CATV station apparatus 100. If an uplink signal is detected, the uplink signal detecting section 340 sets the value of the control signal 350 as 0, for example, so as to cause the corresponding signal generating section 311 to stop generating a predetermined signal. If no uplink signal is detected, on the other hand, the uplink signal detecting section 340 sets the value of the control signal 350 as 1, for example, so as to cause the corresponding signal generating section 311 to be in an operation state.

The signal generating section 311 generates the predetermined signal (a sine-wave signal, for example) in accordance with the control signal 350 output from the uplink signal detecting section 340. In more detail, if the control signal 350 represents 1 (that is, if no uplink signal is detected), the signal generating section 311 generates the above-stated predetermined signal. If the control signal 350 represents 0 (that is, if an uplink signal is detected), on the other hand, the signal generating section 311 does not generate the predetermined signal or, alternatively, does generate the predetermined signal but does not output the generated signal. The multiplexing section 320 frequency-multiplexes the signal heading from the subscriber network 400 toward the CATV station apparatus 100 and the signal output from the signal generating section 311.

In the system illustrated in FIG. 6, the uplink signal detecting section 340 detects the presence or absence of an uplink signal. If an uplink signal exists, no signal is output from the signal generating section 311. In this case, from the node 302, an optical signal modulated with the uplink signal is transmitted. If no uplink signal exists, on the other hand, the predetermined signal is output from the signal generating section 311. In this case, from the node 302, an optical signal modulated with the signal generated by the signal generating section 311 is transmitted. As such, the optical signal passing through the optical fiber 200 has always been modulated with a signal of some type. For this reason, it is possible to prevent a non-linear phenomenon, such as stimulated Brillouin scattering, from occurring in the optical fiber 200.

Therefore, according to the CATV uplink optical transmission system of the present embodiment, it is possible to prevent excessive noise from occurring in the optical transmission system affected by stimulated Brillouin scattering which occurs due to the absence of an uplink signal. It is also possible to prevent an influence of noise occurring in one optical transmission system, the influence being exerted upon communications performed by other optical transmission systems. Furthermore, the signal is output from the signal generating section 311 only when no uplink signal exists. Therefore, an optical modulation index for use in modulation at the node included in the conventional CATV uplink optical transmission system can also be utilized.

Seventh Embodiment

FIG. 7 is an illustration showing the configuration of a CATV uplink optical transmission system according to a seventh embodiment of the present invention. The system illustrated in FIG. 7 includes a CATV station apparatus 100, a plurality of optical fibers 200, a plurality of nodes 303, and a plurality of subscriber networks (coaxial networks) 400. In the present embodiment, components that are the same as those in the fifth embodiment are provided with the same reference numerals, and are not described herein.

Each of the nodes 303 is similar in function to each of the nodes 301 according to the fifth embodiment, except that the signal generating section 310 is replaced by a signal generating section 311 and that a back-reflected optical signal extracting section 360 and a back-reflected optical signal detecting section 370 are further provided.

The back-reflected optical signal extracting section 360 is provided between the optical transmitting section 330 and the optical fiber 200 to extract reflected return light (hereinafter referred to as a back-reflected optical signal) output from the corresponding optical fiber 200. FIGS. 8A and 8B are illustrations showing specific examples of the back-reflected optical signal extracting section 360. The back-reflected optical signal extracting section 360 is implemented by, for example, an optical coupling section 361 having one contact at one end and two contacts at the other end (FIG. 8A) or an optical coupling section 362 (FIG. 8B) having two contacts at both ends.

The optical coupling section 361 is used with one contact Y1 located at one end being connected to the optical fiber 200 and with two contacts X1 and X2 located at the other end being connected to the optical transmitting section 330 and the back-reflected optical signal detecting section 370, respectively. The optical coupling section 362 has a connection similar to that of the optical coupling section 361, with another contact Y2 being terminated. An optical signal output from the optical transmitting section 330 passes via the contacts X1 and Y1 through the optical fiber 200. A back-reflected optical signal output from the optical fiber 200 goes via the contacts Y1 and X2 to the back-reflected optical signal detecting section 370. The back-reflected optical signal also goes via the contacts Y1 and X1 to the optical transmitting section 330.

When the back-reflected optical signal extracting section 360 is implemented by either one of the optical coupling sections illustrated in FIGS. 8A and 8B, it is preferable that the optical coupling section has an asymmetric optical coupling ratio between the contacts X1 and X2 and that the back-reflected optical signal detecting section 370 is connected to one of the contacts which has a smaller value of the optical coupling ratio. The same goes for CATV uplink optical transmission systems according to the eighth, tenth, twelfth, and fourteenth embodiments, which will be described further below, as well as the seventh embodiment, those systems including a node provided with a back-reflected optical signal extracting section.

The back-reflected optical signal detecting section 370 outputs a control signal 351 based on a signal level of the back-reflected optical signal extracted by the back-reflected optical signal extracting section 360. In more detail, the back-reflected optical signal detecting section 370 compares the signal level of the back-reflected optical signal extracted by the back-reflected optical signal extracting section 360 with a reference signal level. If the signal level of the back-reflected optical signal is equal to or higher than the reference signal level, the back-reflected optical signal detecting section 370 sets the value of the control signal 351 as 1, for example, so as to cause the signal generating section 311 to be in an operation state. If the signal level of the back-reflected optical signal is lower than the reference signal level, on the other hand, the back-reflected optical signal detecting section 370 sets the value of the control signal 351 as 0, for example, so as to cause the signal generating section 311 to be in a stop state.

The signal generating section 311 generates a predetermined signal (a sine-wave signal, for example) in accordance with the control signal 351 output from the back-reflected optical signal detecting section 370. In more detail, if the control signal 351 represents 1 (that is, if the signal level of the back-reflected optical signal is equal to or higher than the reference signal level), the signal generating section 311 generates the above predetermined signal. If the control signal represents 0 (that is, if the signal level of the back-reflected optical signal is lower than the reference signal level), the signal generating section 311 does not generate a signal or, alternatively, does generate a signal but does not output the generated signal.

In the system illustrated in FIG. 7, the back-reflected optical signal detecting section 370 determines whether the signal level of the back-reflected optical signal is higher than the predetermined level. If the signal level of the back-reflected optical signal is equal to or higher than the predetermined level, it is determined that no uplink signal exists, and therefore that stimulated Brillouin scattering has occurred in the optical fiber. In this case, a predetermined signal is output from the signal generating section 311, and an optical signal modulated with the signal generated by the signal generating section 311 is transmitted from the node 303. With this, it is possible to prevent stimulated Brillouin scattering from occurring in the optical fiber 200. If the signal level of the back-reflected optical signal is lower than the predetermined level, on the other hand, it is determined that an uplink signal exists, and therefore that no stimulated Brillouin scattering has occurred in the optical fiber. In this case, the signal generating section 311 does not output any signal.

Therefore, according to the CATV uplink optical transmission system of the present embodiment, it is possible to prevent excessive noise from occurring in the optical transmission system affected by stimulated Brillouin scattering which occurs due to the absence of an uplink signal. It is also possible to prevent the influence of noise occurring in one optical transmission system, the influence being exerted upon communications performed by other optical transmission systems.

Eighth Embodiment

Figure 9:
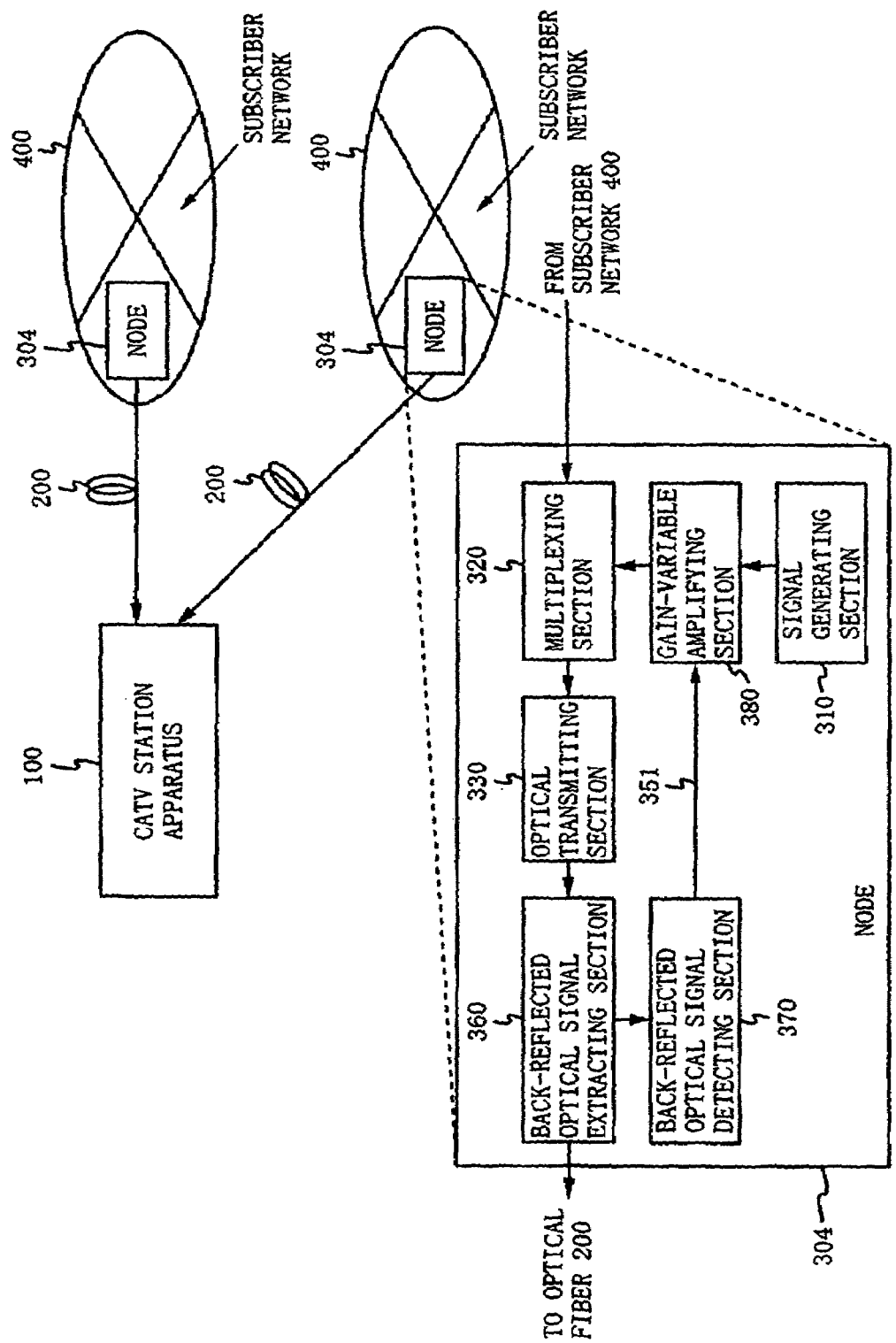
FIG. 9 is an illustration showing the configuration of a CATV uplink optical transmission system according to the eighth embodiment of the present invention.

FIG. 9 is an illustration showing the configuration of a CATV uplink optical transmission system according to an eighth embodiment of the present invention. The system illustrated in FIG. 9 includes a CATV station apparatus 100, a plurality of optical fibers 200, a plurality of nodes 304, and a plurality of subscriber networks (coaxial networks) 400. In the present embodiment, components that are the same as those in the seventh embodiment are provided with the same reference numerals, and are not described herein.

Each of the nodes 304 is similar in function to each of the nodes 303 according to the seventh embodiment, except that the signal generating section 311 is replaced by the signal generating section 310 and that a gain-variable amplifying section 380 is further provided.

The signal generating section 310 is similar to the signal generating section included in the node 301 according to the fifth embodiment. The signal generating section 310 generates a predetermined signal (a sine-wave signal, for example) for coupling with a signal heading from the corresponding subscriber network 400 toward the CATV station apparatus 100. The gain-variable amplifying section 380 is an amplifier capable of varying gain. The gain-variable amplifying section 380 varies the gain in accordance with the control signal 351 output from the back-reflected optical signal detecting section 370 to amplify the signal generated by the signal generating section 310. In more detail, if the control signal 351 represents 1 (that is, if the signal level of the back-reflected optical signal is equal to or higher than the reference signal level), the gain-variable amplifying section 380 amplifies the signal generated by the signal generating section 310 with a gain so that the amplified signal will be significant in the subsequent processes. If the control signal 351 represents 0 (that is, if the signal level of the back-reflected optical signal is lower than the reference signal level), on the other hand, the gain-variable amplifying section 380 does not amplify the signal generated by the signal generating section 310 but outputs a signal at a sufficiently low level compared to the uplink signal.

Therefore, according to the CATV uplink optical transmission system of the present embodiment, as with the seventh embodiment, it is possible to prevent excessive noise from occurring in the optical transmission system affected by stimulated Brillouin scattering which occurs due to the absence of an uplink signal. It is also possible to prevent an influence of noise occurring in one optical transmission system, the influence being exerted upon communications performed by other optical transmission systems. Furthermore, the gain of the gain-variable amplifying section is controlled so as to have a suitable value. With this, the coupling section 320 can couple a signal having a minimum level required for suppressing stimulated Brillouin scattering with the signal heading from the subscriber network 400 toward the CATV apparatus 100. With this, the influence given by the signal generated by the signal generating section 310 to the uplink signal can be minimized.

Ninth Embodiment

Figure 10:
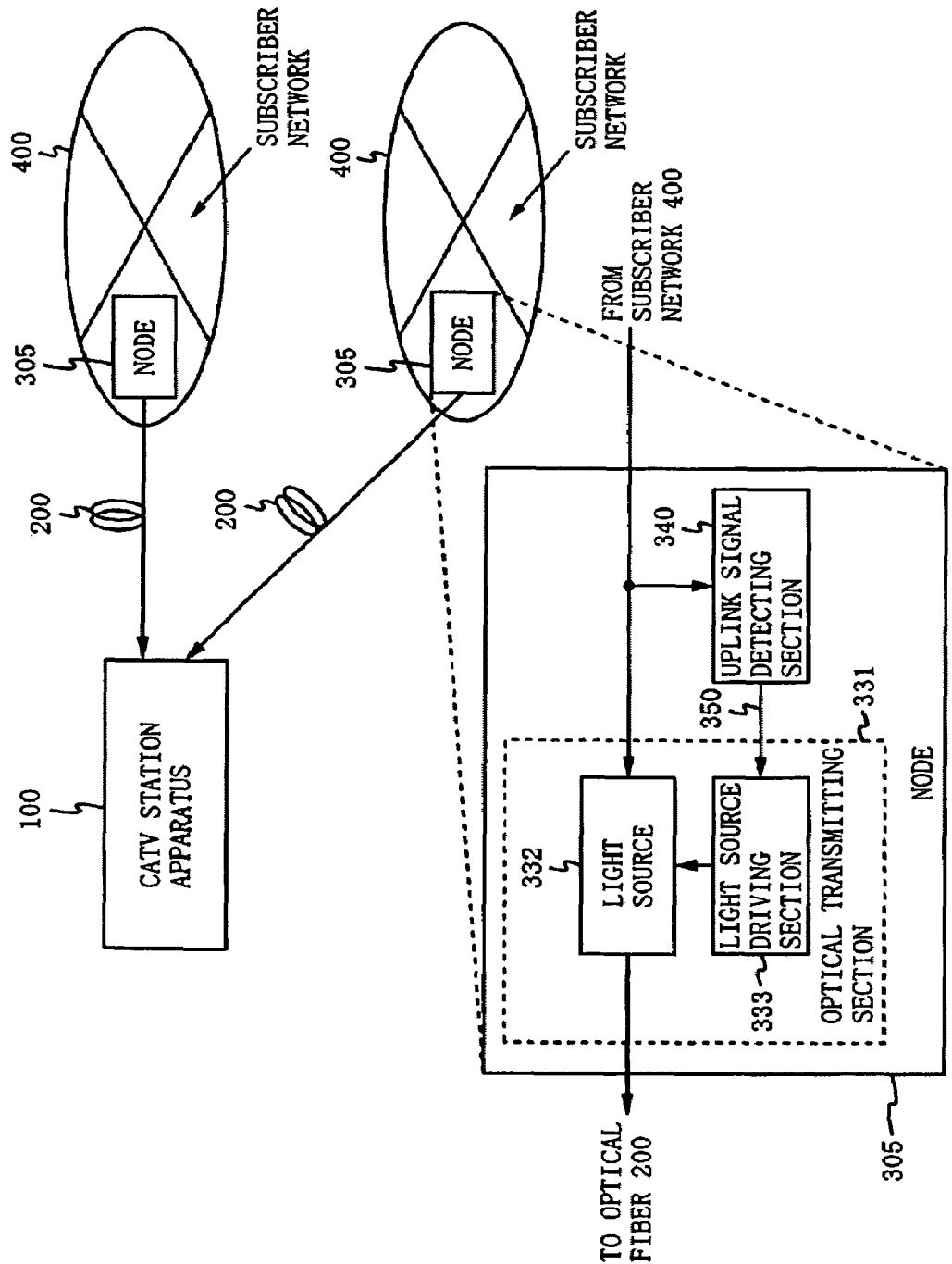
FIG. 10 is an illustration showing the configuration of a CATV uplink optical transmission system according to a ninth embodiment of the present invention.

FIG. 10 is an illustration showing the configuration of a CATV uplink optical transmission system according to a ninth embodiment of the present invention. The system illustrated in FIG. 10 includes a CATV station apparatus 100, a plurality of optical fibers 200, a plurality of nodes 305, and a plurality of subscriber networks (coaxial networks) 400. In the present embodiment, components that are the same as those in the fifth embodiment are provided with the same reference numerals, and are not described herein.

Each of the nodes 305 converts a signal transmitted from a subscriber device (not shown) connected to the corresponding subscriber network 400 to an optical signal, and then transmits the optical signal via the corresponding optical fiber 200 to the CATV station apparatus 100. The node 305 includes a optical transmitting section 331 and an uplink signal detecting section 341.

The uplink signal detecting section 341 detects the presence or absence of an uplink signal included in a signal heading from the subscriber network 400 toward the CATV station apparatus 100, and then outputs a control signal 352 indicative of the presence or absence of an uplink signal. If an uplink signal is detected, the uplink signal detecting section 341 sets the value of the control signal 352 as 1, for example, so as to cause the optical transmitting section 331 to transmit an optical signal of predetermined power. If no uplink signal is detected, on the other hand, the uplink signal detecting section 341 sets the value of the control signal 352 as 0, for example, so as to cause the optical transmitting section 331 to transmit an optical signal of power sufficiently lower than the above predetermined power.

The optical transmitting section 331 includes a light source 332 and a light source driving section 333. Supplied with a bias current from the light source driving section 333, the light source 332 outputs light having predetermined characteristics. In accordance with the control signal 352 output from the uplink signal detecting section 341, the light source driving section 333 switches the level of the bias current to be supplied to the light source 332. In more detail, if the control signal 352 represents 1 (that is, if an uplink signal is detected), the light source driving section 333 supplies the light source 332 with a bias current at a level corresponding to the predetermined power. If the control signal 352 represents 0 (that is, if no uplink signal is detected), the light source driving section 333 supplies the light source 332 with a bias current at a level corresponding to the sufficiently lower power. In this case, the level of the bias current is determined so as not to cause a non-linear phenomenon, such as stimulated Brillouin scattering, in the optical fiber 200 when the optical signal is output from the light source 332.

In the system illustrated in FIG. 10, the uplink signal detecting section 341 detects the presence or absence of an uplink signal. If an uplink signal exists, the optical transmitting section 331 outputs an optical signal of the predetermined power. In this case, the uplink signal heading from the subscriber network 400 to the CATV station apparatus 100 is correctly transmitted. If no uplink signal exists, on the other hand, the optical transmitting section 331 outputs an optical signal of the sufficiently lower power which does not cause a non-linear phenomenon, such as stimulated Brillouin scattering, in the optical fiber 200.

Therefore, according to the CATV uplink optical transmission system of the present embodiment, it is possible to prevent excessive noise from occurring in the optical transmission system affected by stimulated Brillouin scattering which occurs due to the absence of an uplink signal. It is also possible to prevent an influence of noise occurring in one optical transmission system, the influence being exerted upon communications performed by other optical transmission systems. Furthermore, if no uplink signal exists, the bias current to be supplied to the light source is lowered, thereby reducing power consumption of the node.

Tenth Embodiment

Figure 11:
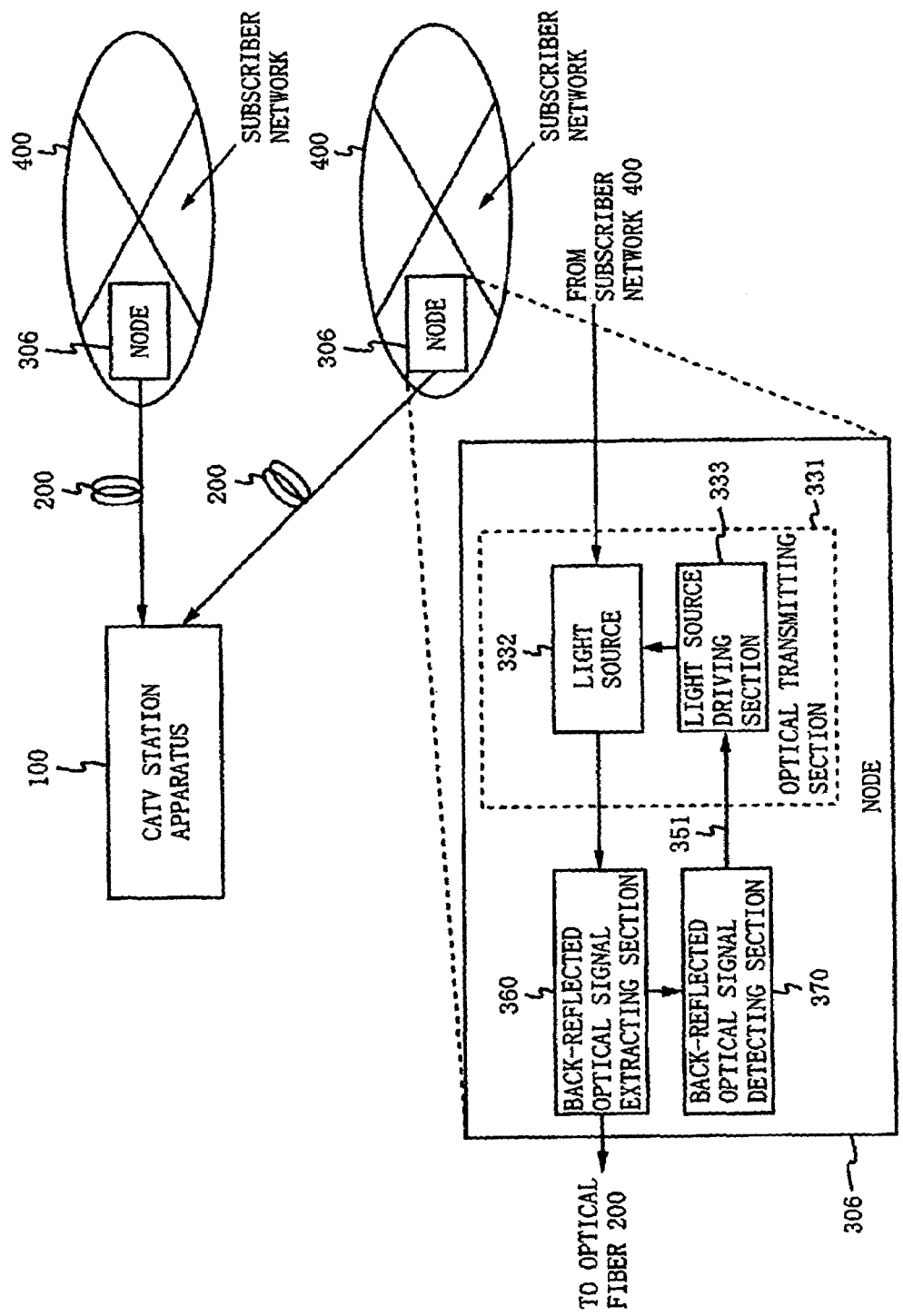
FIG. 11 is an illustration showing the configuration of a CATV uplink optical transmission system according to the tenth embodiment of the present invention.

FIG. 11 is an illustration showing the configuration of a CATV uplink optical transmission system according to a tenth embodiment of the present invention. The system illustrated in FIG. 11 includes a CATV station apparatus 100, a plurality of optical fibers 200, a plurality of nodes 306, and a plurality of subscriber networks (coaxial networks) 400. In the present embodiment, components that are the same as those in the ninth embodiment are provided with the same reference numerals, and are not described herein.

Each of the nodes 306 is similar in function to each of the nodes 305 according to the ninth embodiment, except that the uplink signal detecting section 341 is deleted and that a back-reflected optical signal extracting section 360 and a back-reflected optical signal detecting section 371 are further provided.

The back-reflected optical signal extracting section 360 is the same as the back-reflected optical signal extracting section included in each of the nodes 303 according to the seventh embodiment. The back-reflected optical signal extracting section 360 is provided between the optical transmitting section 331 and the optical fiber 200 to extract a back-reflected optical signal output from the optical fiber 200.

The back-reflected optical signal detecting section 371 outputs a control signal 353 based on the signal level of the back-reflected optical signal extracted by the back-reflected optical signal extracting section 360. The back-reflected optical signal detecting section 371 compares the signal level of the back-reflected optical signal extracted by the back-reflected optical signal extracting section 360 with a reference signal level. If the signal level of the back-reflected optical signal is lower than the reference signal level, the back-reflected optical signal detecting section 371 sets the value of the control signal 353 as 1, for example, so as to cause the optical transmitting section 331 to transmit an optical signal of predetermined power. If the signal level of the back-reflected optical signal is equal to or higher than the reference signal level, the back-reflected optical signal detecting section 371 sets the value of the control signal 353 as 0, for example, so as to cause the optical transmitting section 331 to transmit an optical signal of power sufficiently lower than the above predetermined power.

The light source driving section 333 switches the level of a bias current to be supplied to the light source 332 in accordance with the control signal 353 output from the back-reflected optical signal detecting section 371. In more detail, if the control signal 353 represents 1 (that is, if the signal level of the back-reflected optical signal is lower than the reference signal level), the light source driving section 333 supplies the light source 332 with a bias current at a level corresponding to the predetermined power. If the control signal 353 represents 0 (that is, if the signal level of the back-reflected optical signal is equal to or higher than the reference signal level), the light source driving section 333 supplies the light source 332 with a bias current at a level corresponding to the sufficiently lower power. In this case, the level of the bias current is determined so as not to cause a nonlinear phenomenon, such as stimulated Brillouin scattering, in the optical fiber 200 when the optical signal is output from the light source 332.

In the system illustrated in FIG. 11, the back-reflected optical signal detecting section 371 detects whether the signal level of the back-reflected optical signal is higher than the predetermined level. If the signal level of the back-reflected optical signal is equal to or higher than the predetermined level, it is determined that no uplink signal exists, and therefore that stimulated Brillouin scattering has occurred in the optical fiber. In this case, an optical signal of the sufficiently lower power is output from the optical transmitting section 331. With this, it is possible to prevent stimulated Brillouin scattering from occurring in the optical fiber 200. If the signal level of the back-reflected optical signal is lower than the predetermined level, on the other hand, it is determined that an uplink signal exists, and therefore that no stimulated Brillouin scattering has occurred. In this case, the optical transmitting section 331 transmits an optical signal of the above-stated predetermined power.

Therefore, according to the CATV uplink optical transmission system of the present embodiment, even if excessive noise has occurred in one optical transmission system affected by stimulated Brillouin scattering which occurs due to the absence of an uplink signal, the noise can be suppressed by detecting a back-reflected optical signal to sufficiently lower the power of the optical signal transmitted from the optical transmitting section. Therefore, it is possible to prevent an influence of noise occurring in one optical transmission system, the influence being exerted upon communications performed by other optical transmission systems. Furthermore, if no uplink signal exists, the bias current to be supplied to the light source is lowered, thereby reducing power consumption of the node.

Note that the CATV uplink optical transmission system according to the present embodiment is operated with various conditions (for example, specifications of the light source 332 included in each node 306) being set so as to prevent stimulated Brillouin scattering from occurring in the optical fiber when uplink signals of one or more channels are transmitted.

Eleventh Embodiment

Figure 12:
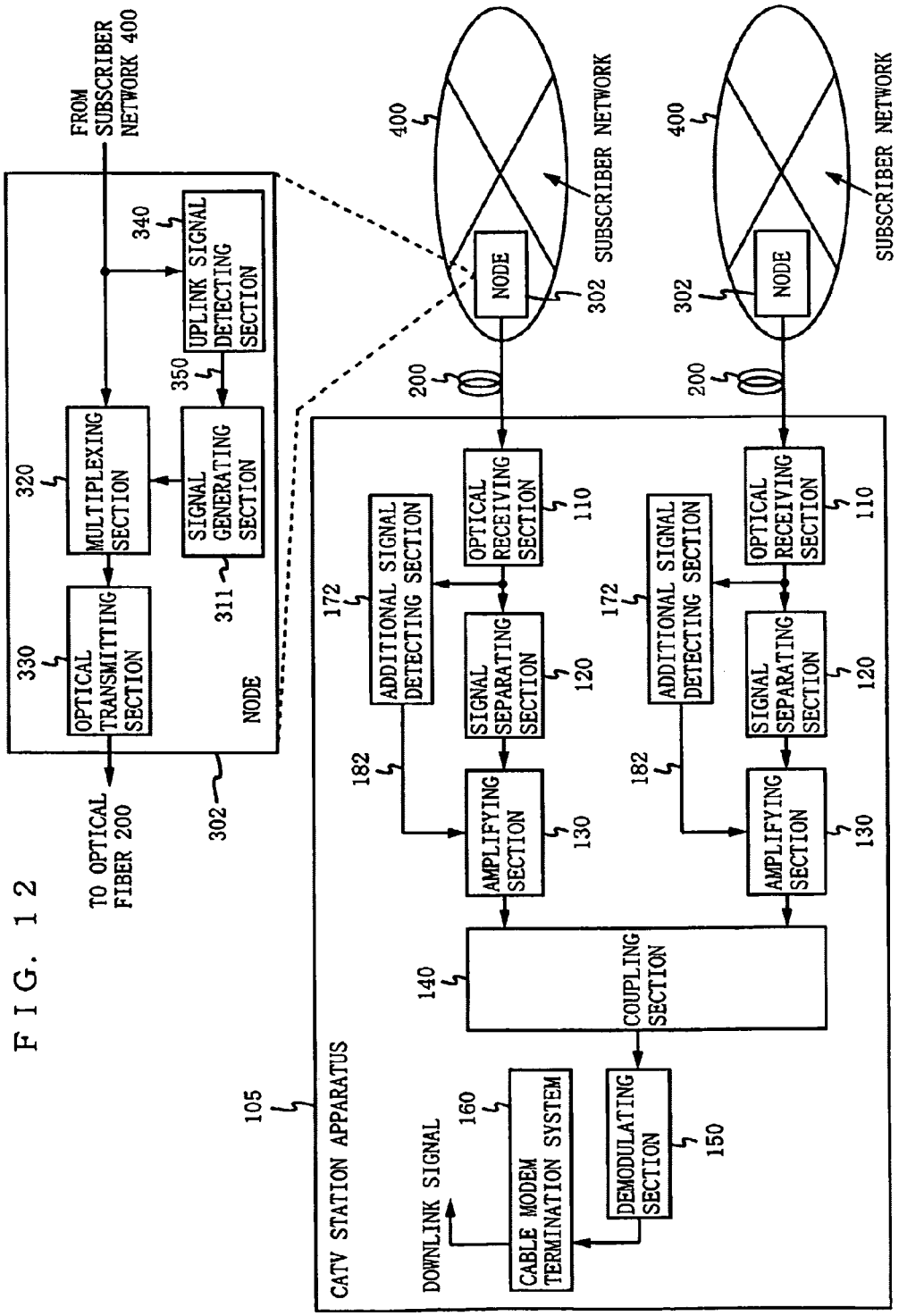
FIG. 12 is an illustration showing the configuration of a CATV uplink optical transmission system according to an eleventh embodiment of the present invention.

FIG. 12 is an illustration showing the configuration of a CATV uplink optical transmission system according to an eleventh embodiment of the present invention. The system illustrated in FIG. 12 includes a CATV station apparatus 105, a plurality of optical fibers 200, a plurality of nodes 302, and a plurality of subscriber networks (coaxial networks) 400. In the present embodiment, components that are the same as those in the third or sixth embodiment are provided with the same reference numerals, and are not described herein.

Each of the nodes 302 is the same as each of the nodes according to the sixth embodiment. The CATV station apparatus 105 is similar in function to the CATV station apparatus 103 according to the third embodiment, except that the uplink signal detecting section 171 is replaced by an additional signal detecting section 172.

The additional signal detecting section 172 detects whether the electrical signal output from the optical receiving section 110 includes a predetermined signal generated by the signal generating section 311 of the node 302 (hereinafter referred to as an additional signal), and then outputs a control signal 182 indicative of the detection result. In more detail, if the electrical signal output from the optical receiving section 110 does not include an additional signal, the additional signal detecting section 172 sets the value of the control signal 182 as 1, for example so as to turn the amplifying section 130 to be in ON state. If the electrical signal output from the optical receiving section 110 includes an additional signal, on the other hand, the additional signal detecting section 172 sets the value of the control signal 182 as 0, for example so as to turn the amplifying section 130 to be in OFF state. In accordance with the control signal 182 output from the additional signal detecting section 172, the amplifying section 130 amplifies the data communication signal output from the signal separating section 120. Note that the additional signal detecting section 172 can be simpler in structure than the uplink signal detecting section if the structure of the additional signal is simple (if the additional signal is a sine-wave signal, for example).

In the system illustrated in FIG. 12, the uplink signal detecting section 340 of the node 302 detects the presence or absence of an uplink signal. Also, the additional signal detecting section 172 of the CATV station apparatus 105 detects the presence or absence of an additional signal. If an uplink signal exists, no additional signal is output from the signal generating section 311, and an optical signal modulated with the uplink signal is transmitted from the optical transmitting section 330. In this case, the additional signal detecting section 172 detects no additional signal. Therefore, the amplifying section 130 is controlled to be in ON state. If no uplink signal exists, on the other hand, an additional signal is output from the signal generating section 311, and an optical signal modulated with the additional signal is transmitted from the optical transmitting section 330. In this case, the additional signal detecting section 172 detects the additional signal. Therefore, the amplifying section 130 is controlled to be in OFF state.

As such, in the system illustrated in FIG. 12, if no uplink signal exists, an additional signal is coupled in the node. With this, it is possible to prevent the occurrence of a non-linear phenomenon, such as stimulated Brillouin scattering. Also, in the CATV station apparatus, the amplifying section is controlled to be in OFF state, thereby preventing the received optical signal from affecting communications performed by other optical transmission systems.

Therefore, according to the CATV uplink optical transmission system of the present embodiment, it is possible to prevent excessive noise from occurring in the optical transmission system affected by stimulated Brillouin scattering which occurs due to the absence of an uplink signal. Furthermore, signals containing no uplink signal are excluded from processing in the CATV station apparatus. Therefore, even if noise occurs in the optical transmission system due to various reasons, it is still possible to prevent an influence of the noise upon communications performed by other optical transmission systems.

In the CATV station apparatus 105 of the system illustrated in FIG. 12, the additional signal detecting section 172 detects the presence or absence of an additional signal included in the electrical signal output from the optical receiving section 110. This is not meant to be restrictive. Alternatively, the additional signal detecting section may detect the presence or absence of an additional signal included in a signal at an arbitrary point located from the optical receiving section 110 to the amplifying section 130. The same goes for CATV uplink optical transmission systems according to twelfth through fourteenth embodiments, which will be described below, as well as the eleventh embodiment, those systems including a CATV station apparatus provided with an additional signal detecting section.

Twelfth Through Fourteenth Embodiments

Figure 13:
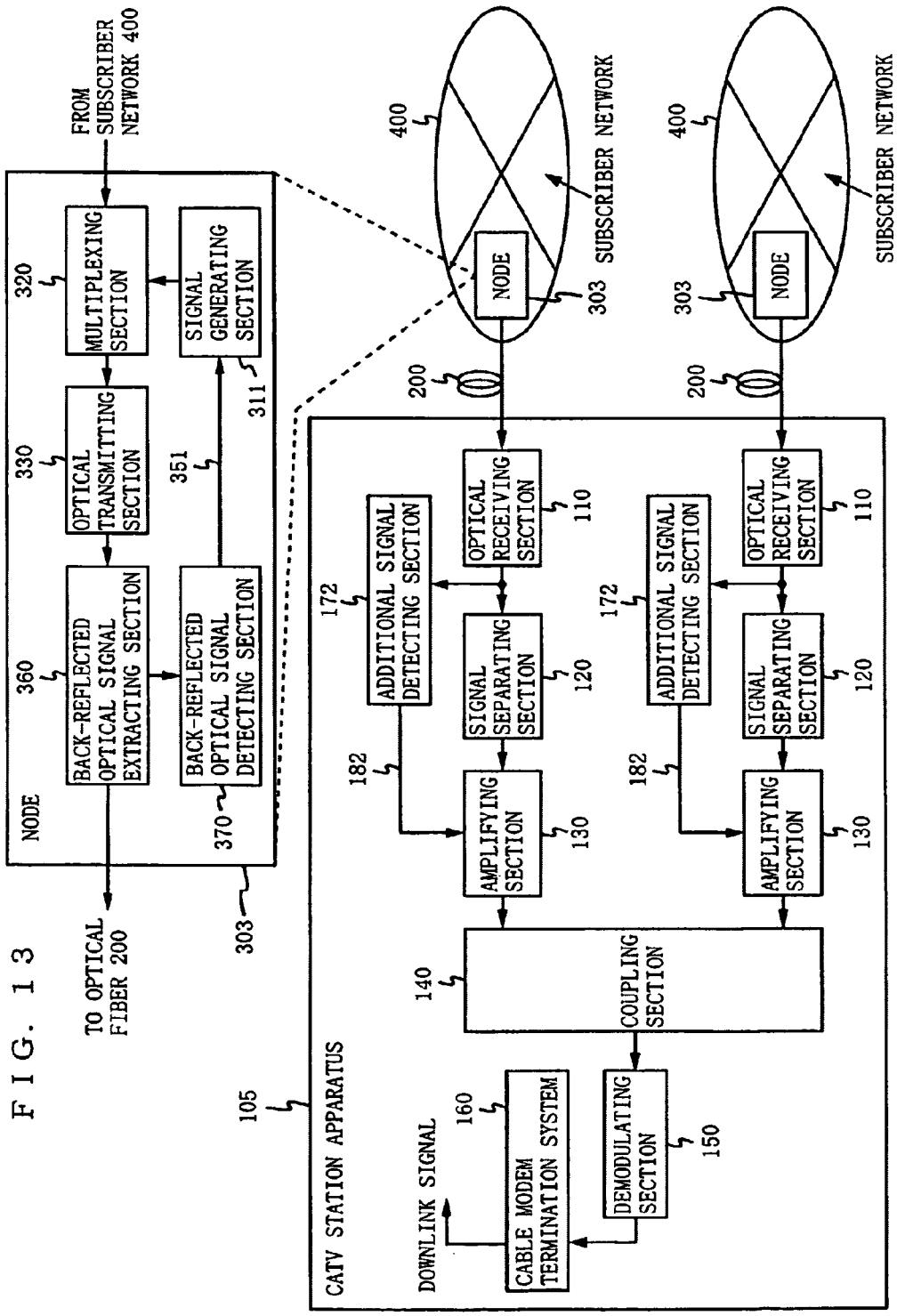
FIG. 13 is an illustration showing the configuration of a CATV uplink optical transmission system according to the twelfth embodiment of the present invention.

FIG. 13 is an illustration showing the configuration of a CATV uplink optical transmission system according to a twelfth embodiment of the present invention. The system illustrated in FIG. 13 includes a CATV station apparatus 105, a plurality of optical fibers 200, a plurality of nodes 303, and a plurality of subscriber networks (coaxial networks) 400. Each of the nodes 303 is the same as each of the nodes according to the seventh embodiment. The CATV station apparatus 105 is the same as the CATV station apparatus according to the eleventh embodiment. As evident from the descriptions of the seventh and eleventh embodiments, the system illustrated in FIG. 13 achieves operations and effects similar to those of the CATV uplink optical transmission system according to the eleventh embodiment.

Figure 14:
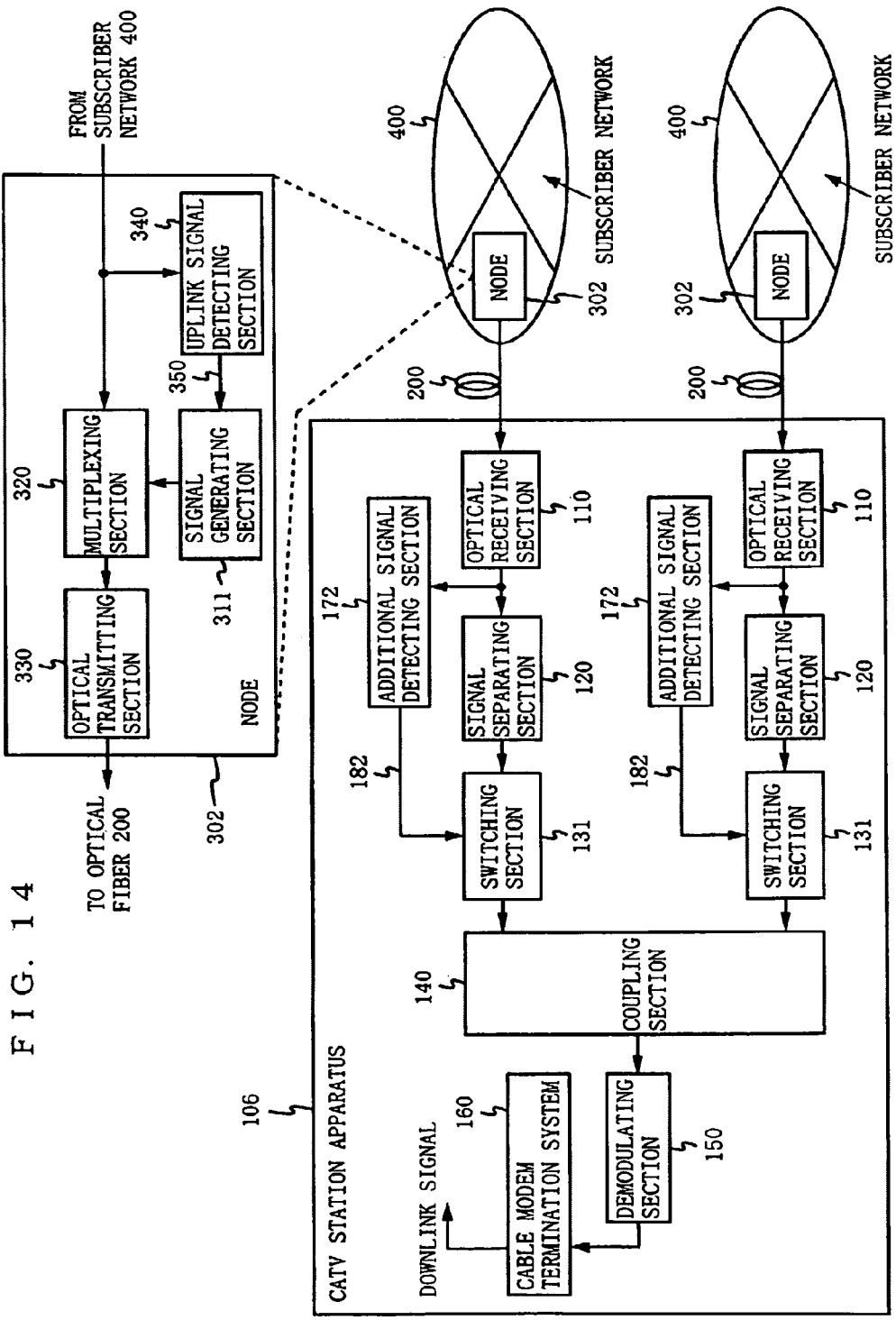
FIG. 14 is an illustration showing the configuration of a CATV uplink optical transmission system according to a thirteenth embodiment of the present invention.

FIG. 14 is an illustration showing the configuration of a CATV uplink optical transmission system according to a thirteenth embodiment of the present invention. The system illustrated in FIG. 14 includes a CATV station apparatus 106, a plurality of optical fibers 200, a plurality of nodes 302, and a plurality of subscriber networks (coaxial networks) 400. Each of the nodes 302 is the same as each of the nodes according to the sixth embodiment. The CATV station apparatus 106 is similar to the CATV station apparatus according to the eleventh embodiment, except that the amplifying section 130 is replaced by a switching section 131. As evident from the descriptions of the third, fourth, sixth, and eleventh embodiments, the system illustrated in FIG. 14 achieves operations and effects similar to those of the CATV uplink optical transmission system according to the eleventh embodiment.

Figure 15:
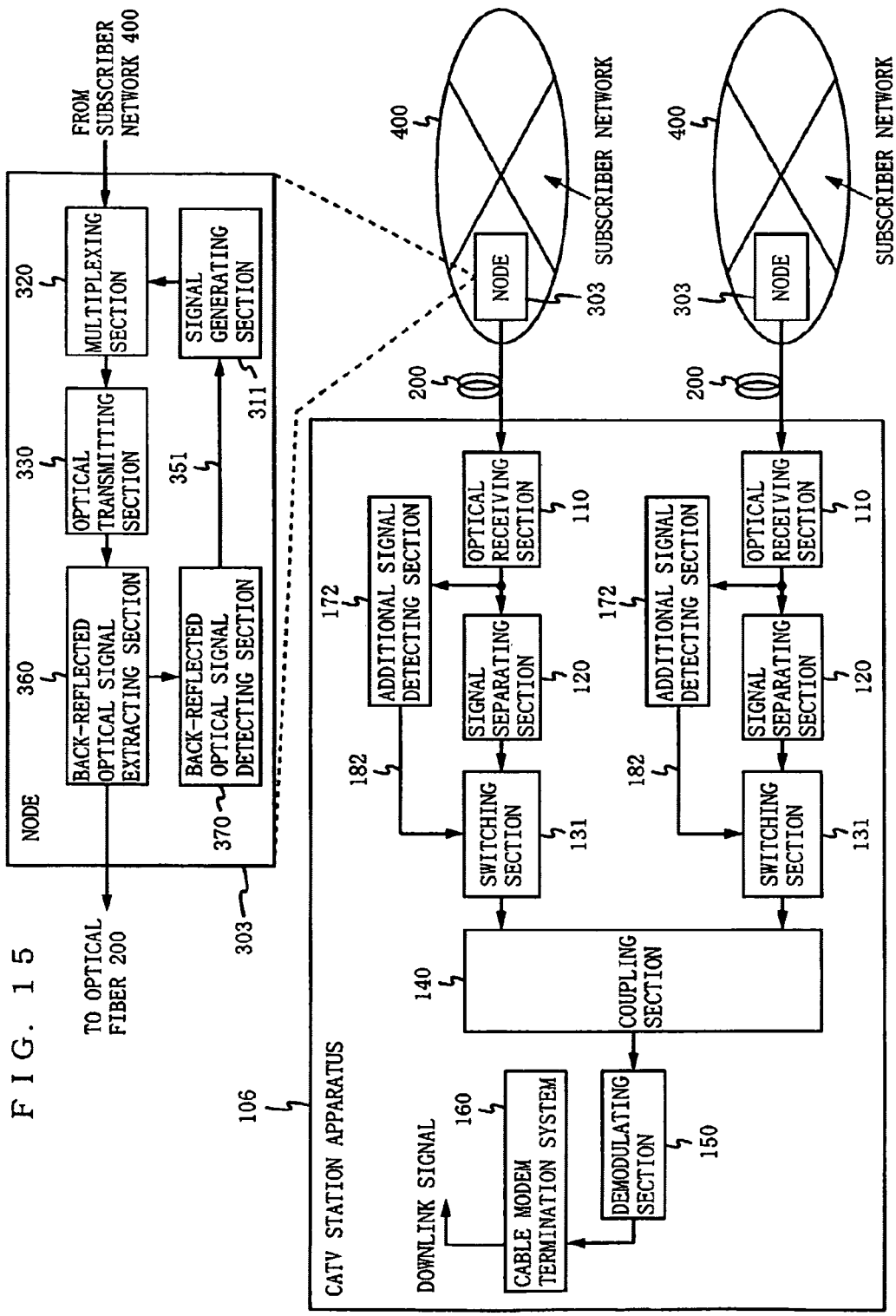
FIG. 15 is an illustration showing the configuration of a CATV uplink optical transmission system according to the fourteenth embodiment of the present invention.

FIG. 15 is an illustration showing the configuration of a CATV uplink optical transmission system according to a fourteenth embodiment of the present invention. The system illustrated in FIG. 15 includes a CATV station apparatus 106, a plurality of optical fibers 200, a plurality of nodes 303, and a plurality of subscriber networks (coaxial networks) 400. Each of the nodes 303 is the same as each of the nodes according to the seventh embodiment. The CATV station apparatus 106 is the same as the CATV station apparatus according to the twelfth embodiment. As evident from the descriptions of the third, fourth, seventh, and eleventh embodiments, the system illustrated in FIG. 15 achieves operations and effects similar to those of the CATV uplink optical transmission system according to the eleventh embodiment.

According to the CATV uplink optical transmission systems of the twelfth to fourteenth embodiments, as with the eleventh embodiment, it is possible to prevent excessive noise from occurring in the optical transmission system affected by stimulated Brillouin scattering which occurs due to the absence of an uplink signal. Furthermore, signals containing no uplink signal are excluded from processing in the CATV station apparatus. Therefore, even if noise occurs in the optical transmission system due to various reasons, It is still possible to prevent an influence of the noise upon communications performed by other optical transmission systems.

In each of the above embodiments, the descriptions have been made to the uplink optical transmission system included in a CATV system using an HFC which is formed by connecting an optical fiber and a coaxial transmission line. The scope of the present invention is not restricted to the above. The present invention can also be applied to an optical transmission system used in other configurations. Specifically, the present invention can be applied to an optical transmission system in which n optical signals transmitted in a burst manner are individually converted by n optical transmission systems to electrical signals, and the electric signals are then subjected to various processes. Such an optical transmission system can achieve effects similar to those of the above-described embodiments of the present invention by adopting the configurations of these embodiments.

While the invention has been described in detail, the foregoing description is in all aspects illustrative and not restrictive. It is understood that numerous other modifications and variations can be devised without departing from the scope of the invention.

What is claimed is:

1. A CATV station apparatus included in a CATV system for performing bi-directional communications using a bi-directional transmission line which is formed by connecting an optical fiber and a coaxial transmission line, the CATV station apparatus comprising:
    at least one optical receiving section for receiving a signal transmitted through the optical fiber, and converting the received signal to an electrical signal;
    a signal processing section for performing a predetermined process on a signal output from the at least one optical receiving section;
    at least one state detecting section for detecting a reception state of the at least one optical receiving section; and
    at least one signal interrupting section provided between the at least one optical receiving section and the signal processing section for interrupting, in accordance with the reception state detected by the at least one state detecting section, a signal flow heading from the at least one optical receiving section toward the signal processing section.

2. The CATV station apparatus according to claim 1, wherein the at least one state detecting section includes a received photocurrent monitoring section for detecting a received photocurrent at the at least one optical receiving section, and the at least one signal interrupting section includes an amplifying section for amplifying the signal output from the at least one optical receiving section only when the detected received photocurrent is higher than a predetermined level, and outputting the amplified signal to the signal processing section.

3. The CATV station apparatus according to claim 1, wherein the at least one state detecting section includes a received photocurrent monitoring section for detecting a received photocurrent at the at least one optical receiving section, and the at least one signal interrupting section includes a switching section for passing the signal output from the at least one optical receiving section to the signal processing section only when the detected received photocurrent is higher than a predetermined level.

4. The CATV station apparatus according to claim 1, wherein the at least one state detecting section includes an uplink signal detecting section for detecting the presence or absence of an uplink signal included in the signal output from the at least one optical receiving section, and the at least one signal interrupting section includes an amplifying section for amplifying the signal output from the at least one optical receiving section only when the uplink signal is detected, and outputting the amplified signal to the signal processing section.

5. The CATV station apparatus according to claim 1, wherein the at least one state detecting section includes an uplink signal detecting section for detecting the presence or absence of an uplink signal included in the signal output from the at least one optical receiving section, and the at least one signal interrupting section includes a switching section for passing the signal output from the at least one optical receiving section to the signal processing section only when the uplink signal is detected.

6. The CATV station apparatus according to claim 4, further comprising:
    at least one signal separating section provided between the at least one optical receiving section and the at least one signal interrupting section for separating the signal output from the at least one optical receiving section into a data communication signal and other signals,
    wherein the uplink signal detecting section detects the presence or absence of an uplink signal included in the data communication signal.

7. The CATV station apparatus according to claim 1, wherein the signal processing section couples signals output from a plurality of the optical receiving sections, and demodulates the resultant signal.

8. A node device included in a CATV system for performing bi-directional communications using a bi-directional transmission line which is formed by connecting an optical fiber and a coaxial transmission line, the node device comprising:
    a signal generating section for generating a predetermined signal;
    a coupling section for coupling a signal transmitted through the coaxial transmission line and the signal output from the signal generating section;
    an optical transmitting section for converting a signal output from the coupling section to an optical signal, and sending the optical signal to the optical fiber;
    a back-reflected optical signal extracting section for extracting a back-reflected optical signal from the optical fiber; and
    a back-reflected optical signal detecting section for detecting a signal level of the back-reflected optical signal, wherein
    the signal generating section outputs the generated signal only when the signal level of the back-reflected optical signal is higher than a predetermined level.

9. A node device included in a CATV system for performing bi-directional communications using a bi-directional transmission line which is formed by connecting an optical fiber and a coaxial transmission line, the node device comprising:
    a signal generating section for generating a predetermined signal;
    a coupling section for coupling a signal transmitted through the coaxial transmission line and the signal output from the signal generating section;
    an optical transmitting section for converting a signal output from the coupling section to an optical signal, and sending the optical signal to the optical fiber;
    a back-reflected optical signal extracting section for extracting a back-reflected optical signal from the optical fiber;
    a back-reflected optical signal detecting section for detecting a signal level of the back-reflected optical signal; and
    a gain-variable amplifying section for switching a gain in accordance with the signal level of the back-reflected optical signal, and amplifying the signal generated by the signal generating section,
    wherein the coupling section couples the signal transmitted through the coaxial transmission line and the signal amplified by the gain-variable amplifying section.

10. The node device according to claim 8, wherein the back-reflected optical signal extracting section includes an optical coupling section having an asymmetric optical coupling ratio between contacts provided therein, and the back-reflected optical signal detecting section is connected to one of the contacts that has a smaller value of the optical coupling ratio.

11. A node device included in a CATV system for performing bi-directional communications using a bi-directional transmission line which is formed by connecting an optical fiber and a coaxial transmission line, the node device comprising:
an optical transmitting section provided with a light source and a light source driving section for sending, through the optical fiber, an optical signal which is based on a signal transmitted through the coaxial transmission line; and
a state detecting section for detecting a transmission state of the optical transmitting section, wherein
the light source driving section controls a bias current to be supplied to the light source in accordance with the transmission state detected by the state detecting section,
the state detecting section includes a back-reflected optical signal extracting section for extracting a back-reflected optical signal from the optical fiber, and a back-reflected optical signal detecting section for detecting a signal level of the back-reflected optical signal, and
only when the signal level of the back-reflected optical signal is lower than a predetermined level, the light source driving section supplies the light source with a bias current at a level sufficient for performing optical communications.

12. The node device according to claim 11, wherein the back-reflected optical signal extracting section includes an optical coupling section having an asymmetric optical coupling ratio between contacts provided therein, and the back-reflected optical signal detecting section is connected to one of the contacts that has a smaller value of the optical coupling ratio.

13. An uplink optical transmission system included in a CATV system for performing bi-directional communications using a bi-directional transmission line which is formed by connecting an optical fiber and a coaxial transmission line, the system comprising:
a node device; and
a CATV station apparatus, wherein
the node device includes:
a signal generating section for generating a predetermined additional signal in accordance with a control signal;
a coupling section for coupling a signal transmitted through the coaxial transmission line and the signal output from the signal generating section;
an optical transmitting section for converting a signal output from the coupling section to an optical signal, and sending the optical signal to the optical fiber; and
a state detecting section for detecting a transmission state of the optical transmitting section, and outputting the control signal, and
the CATV station apparatus includes:
at least one optical receiving section for receiving a signal transmitted through the optical fiber, and converting the received signal to an electrical signal;
a signal processing section for performing a predetermined process on a signal output from the at least one optical receiving section;
at least one additional signal detecting section for detecting the presence or absence of the additional signal included in the electrical signal output from the at least one optical receiving section; and
at least one signal interrupting section provided between the at least one optical receiving section and the signal processing section for interrupting, when the additional signal is detected, a signal flow heading from the at least one optical receiving section toward the signal processing section.

14. The uplink optical transmission system according to claim 13, wherein the state detecting section includes an uplink signal detecting section for detecting the presence or absence of an uplink signal included in the signal transmitted through the coaxial transmission line, and the signal generating section outputs the additional signal only when the uplink signal is not detected.

15. The uplink optical transmission system according to claim 13, wherein the state detecting section includes a back-reflected optical signal extracting section for extracting a back-reflected optical signal from the optical fiber and a back-reflected optical signal detecting section for detecting a signal level of the back-reflected optical signal, and the signal generating section outputs the additional signal only when the signal level of the back-reflected optical signal is higher than a predetermined level.

16. The uplink optical transmission system according to claim 15, wherein the back-reflected optical signal extracting section includes an optical coupling section having an asymmetric optical coupling ratio between contacts provided therein, and the back-reflected optical signal detecting section is connected to one of the contacts that has a smaller value of the optical coupling ratio.

17. The uplink optical transmission system according to claim 13, wherein the at least one signal interrupting section includes an amplifying section for amplifying the signal output from the at least one optical receiving section only when the additional signal is not detected, and outputting the amplified signal to the signal processing section.

18. The uplink optical transmission system according to claim 13, wherein the at least one signal interrupting section includes a switching section for passing the signal output from the at least one optical receiving section to the signal processing section only when the additional signal is not detected.

19. The uplink optical transmission system according to claim 13, wherein a frequency of the signal generated by the signal generating section is within a frequency band outside a frequency band of the uplink signal included in the signal transmitted by using the coaxial transmission line.

20. The uplink optical transmission system according to claim 13, wherein the signal processing section couples signals output from a plurality of the optical receiving sections, and demodulates the resultant signal.

21. The CATV station apparatus according to claim 5, further comprising:
at least one signal separating section provided between the at least one optical receiving section and the at least one signal interrupting section for separating the signal output from the at least one optical receiving section into a data communication signal and other signals, wherein
the uplink signal detecting section detects the presence or absence of an uplink signal included in the data communication signal.

22. The node device according to claim 9, wherein the back-reflected optical signal extracting section includes an optical coupling section having an asymmetric optical coupling ratio between contacts provided therein, and the back-reflected optical signal detecting section is connected to one of the contacts that has a smaller value of the optical coupling ratio.

* * * * *